July 21, 1936.  A. A. DICKE  2,048,060
CASH REGISTER
Filed Feb. 24, 1927    10 Sheets-Sheet 2
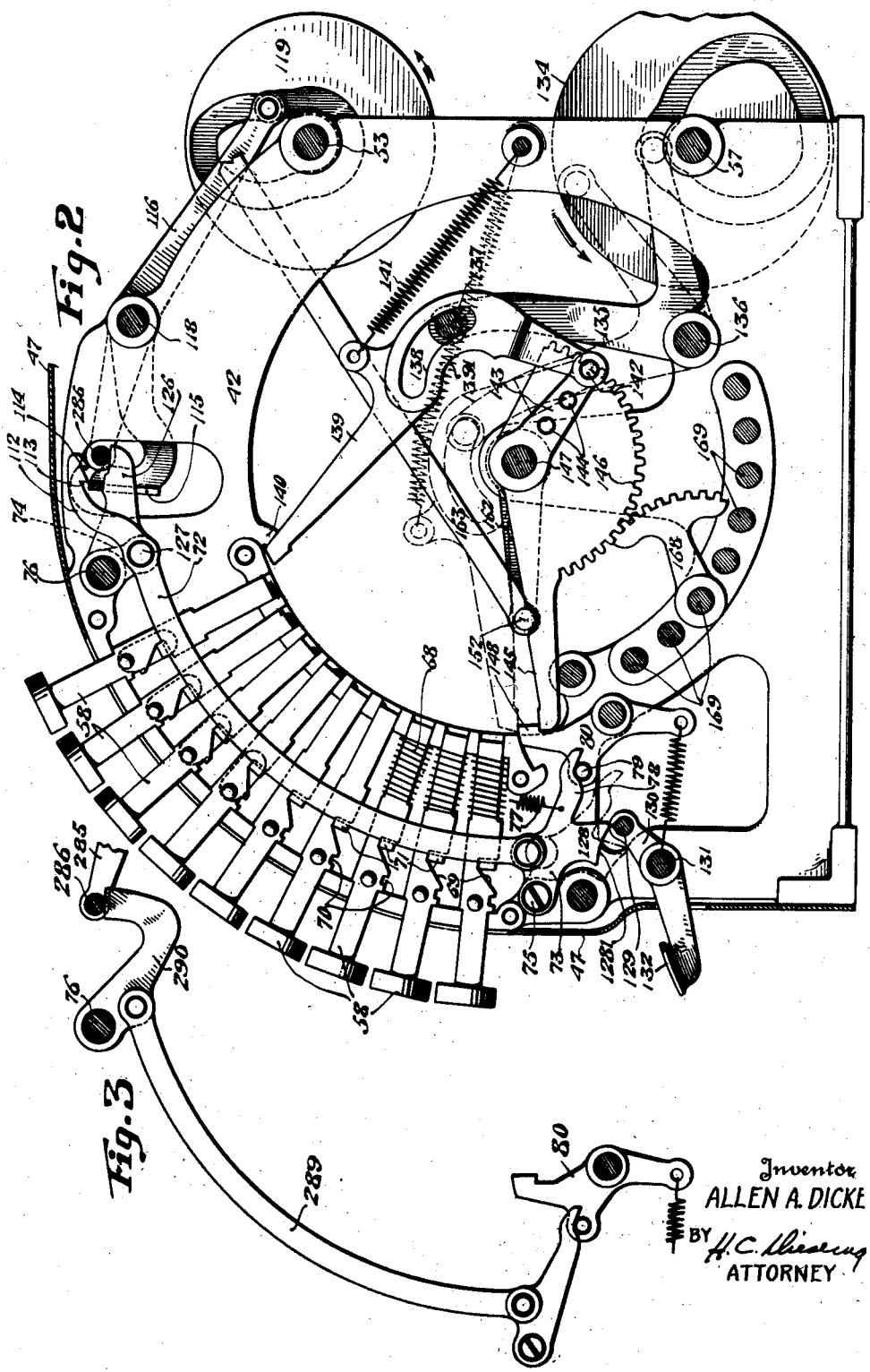
Inventor
ALLEN A. DICKE
BY H. C. Thiering
ATTORNEY

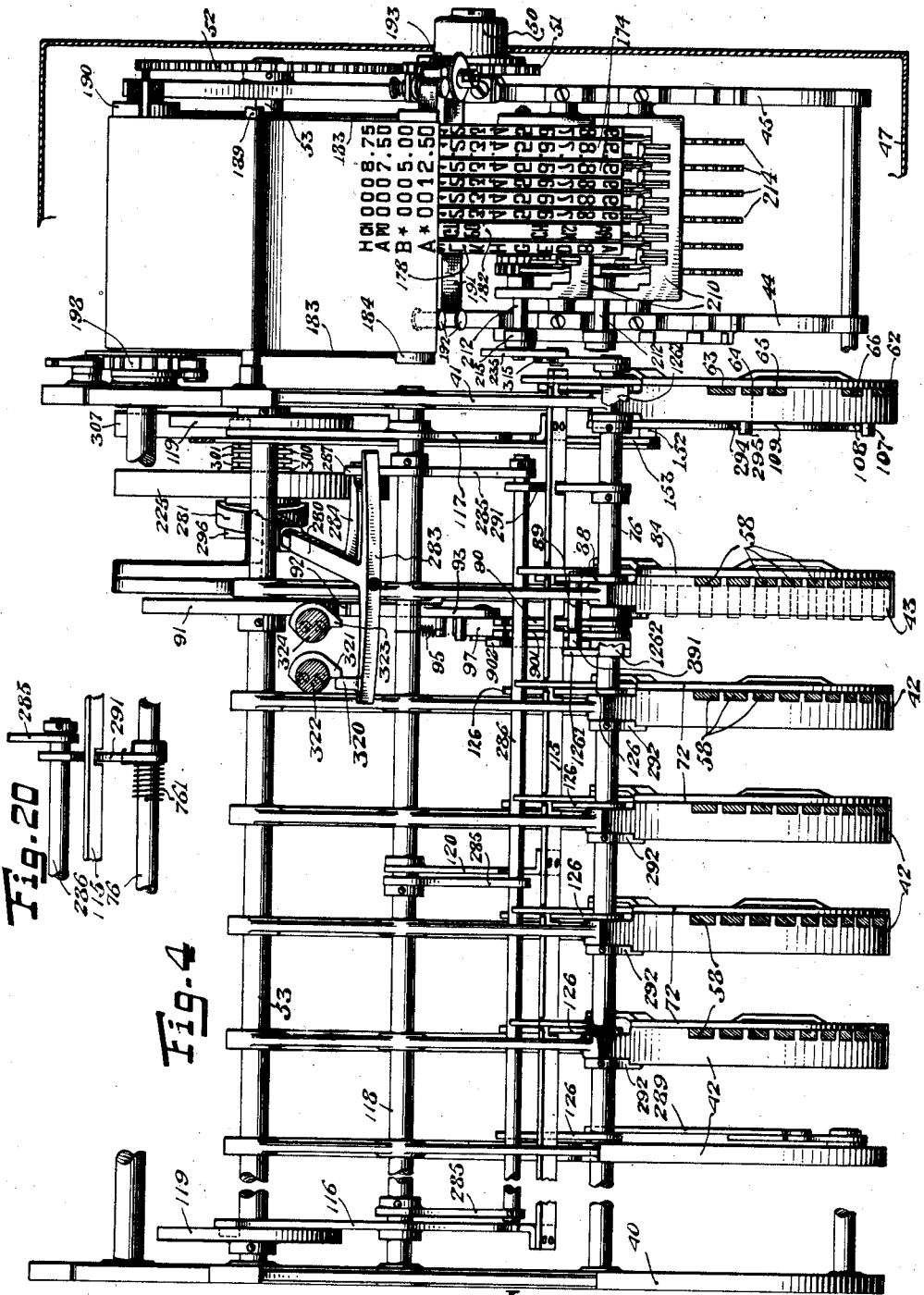

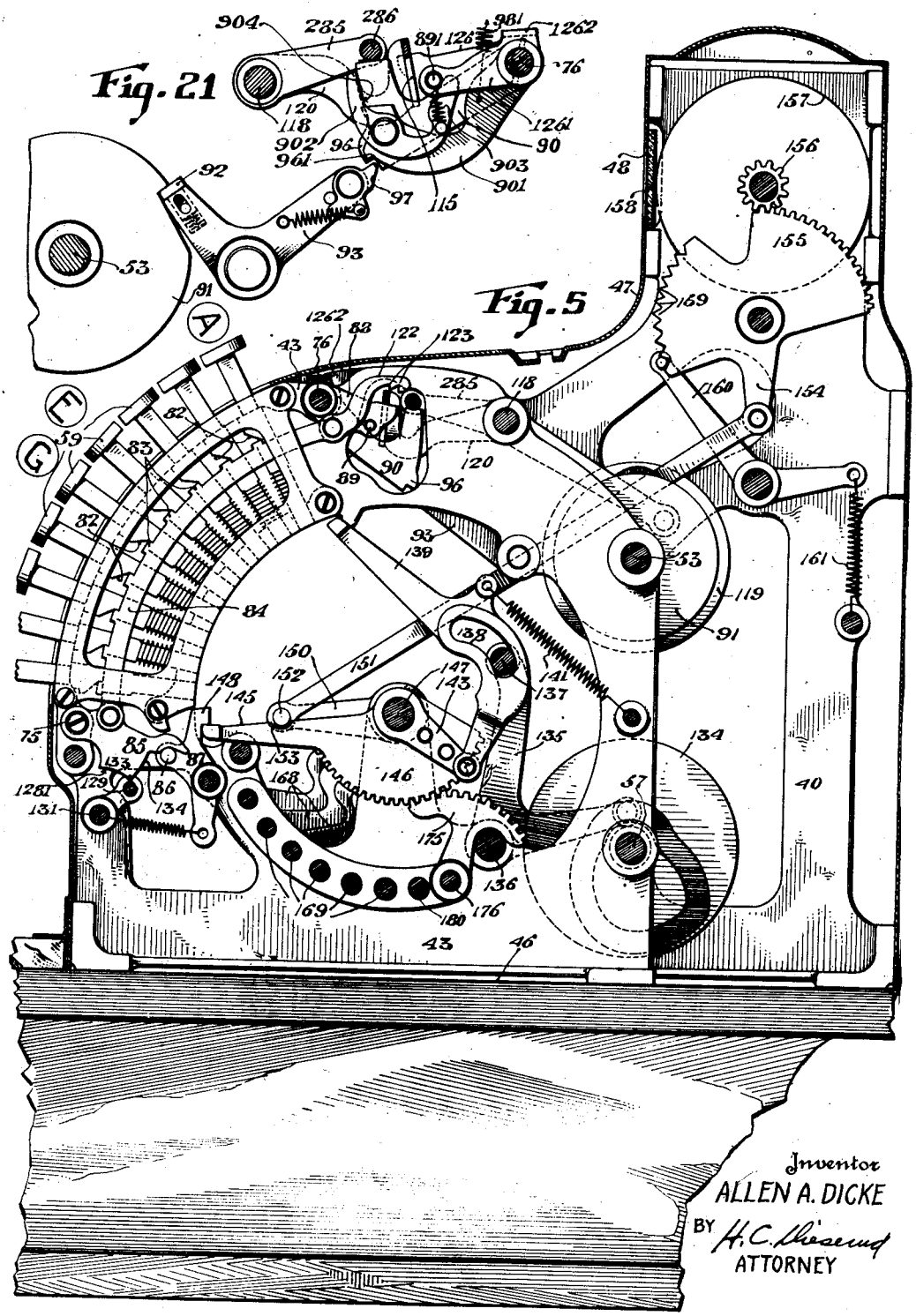

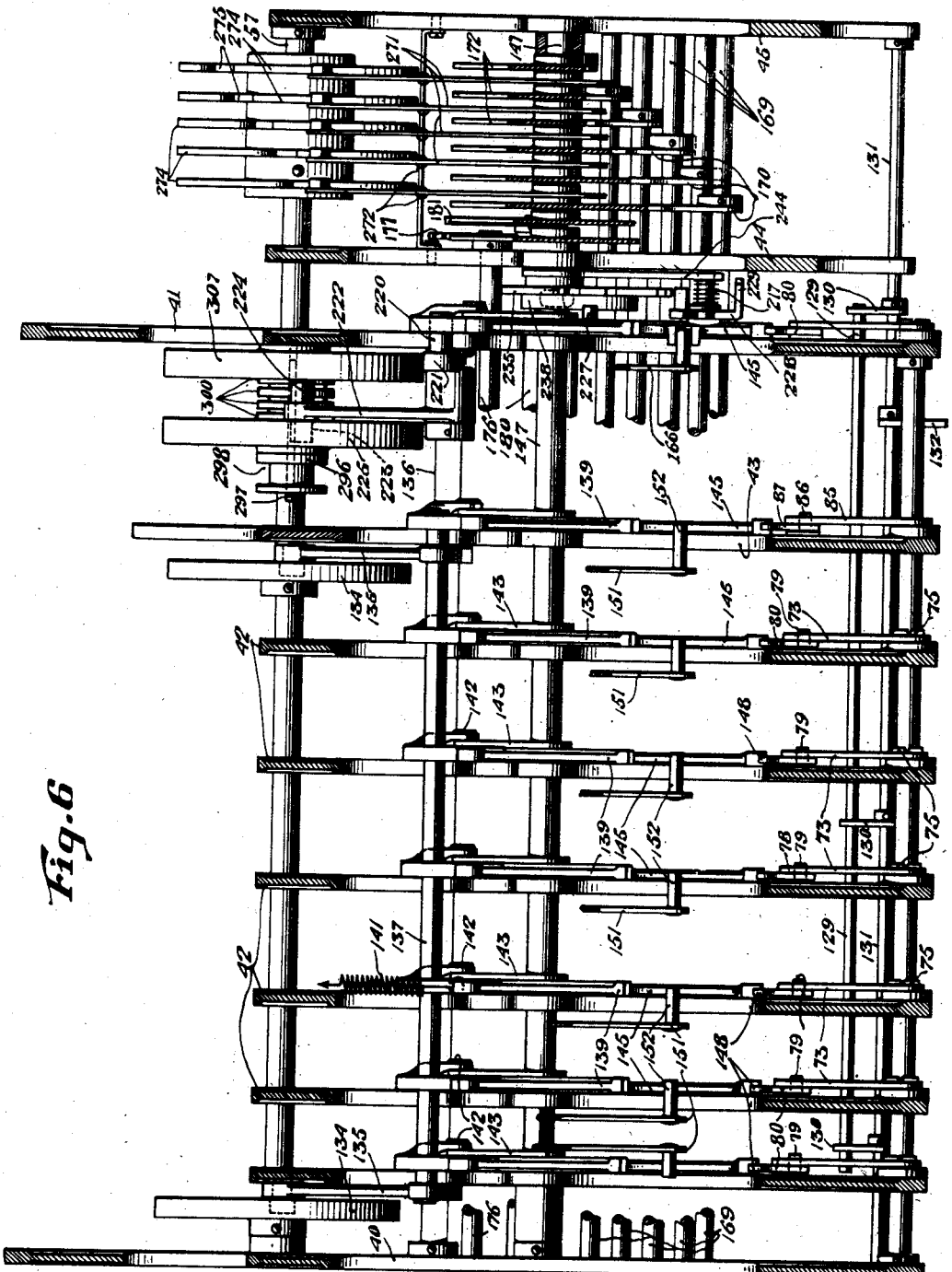

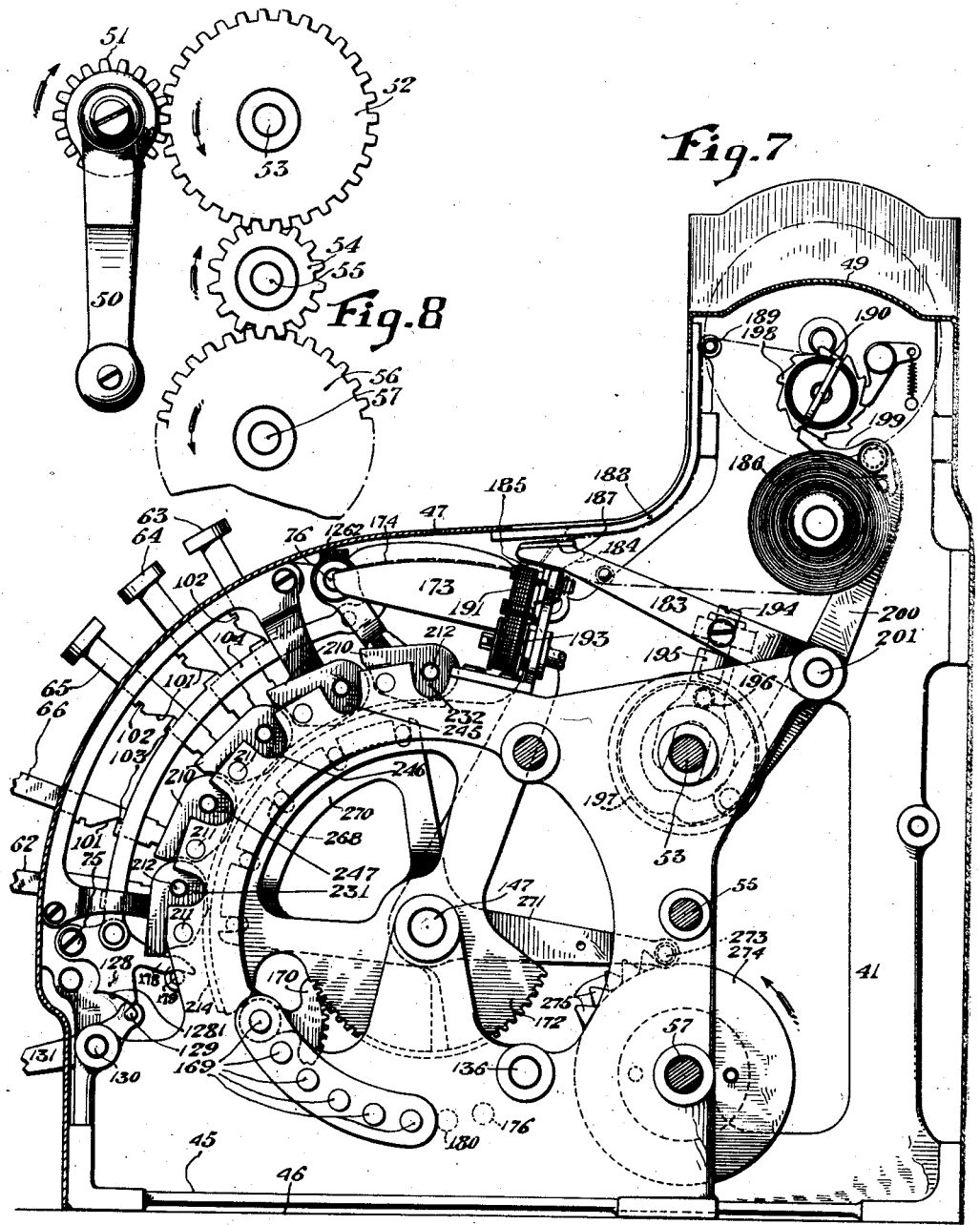

July 21, 1936.  A. A. DICKE  2,048,060
CASH REGISTER
Filed Feb. 24, 1927  10 Sheets-Sheet 7
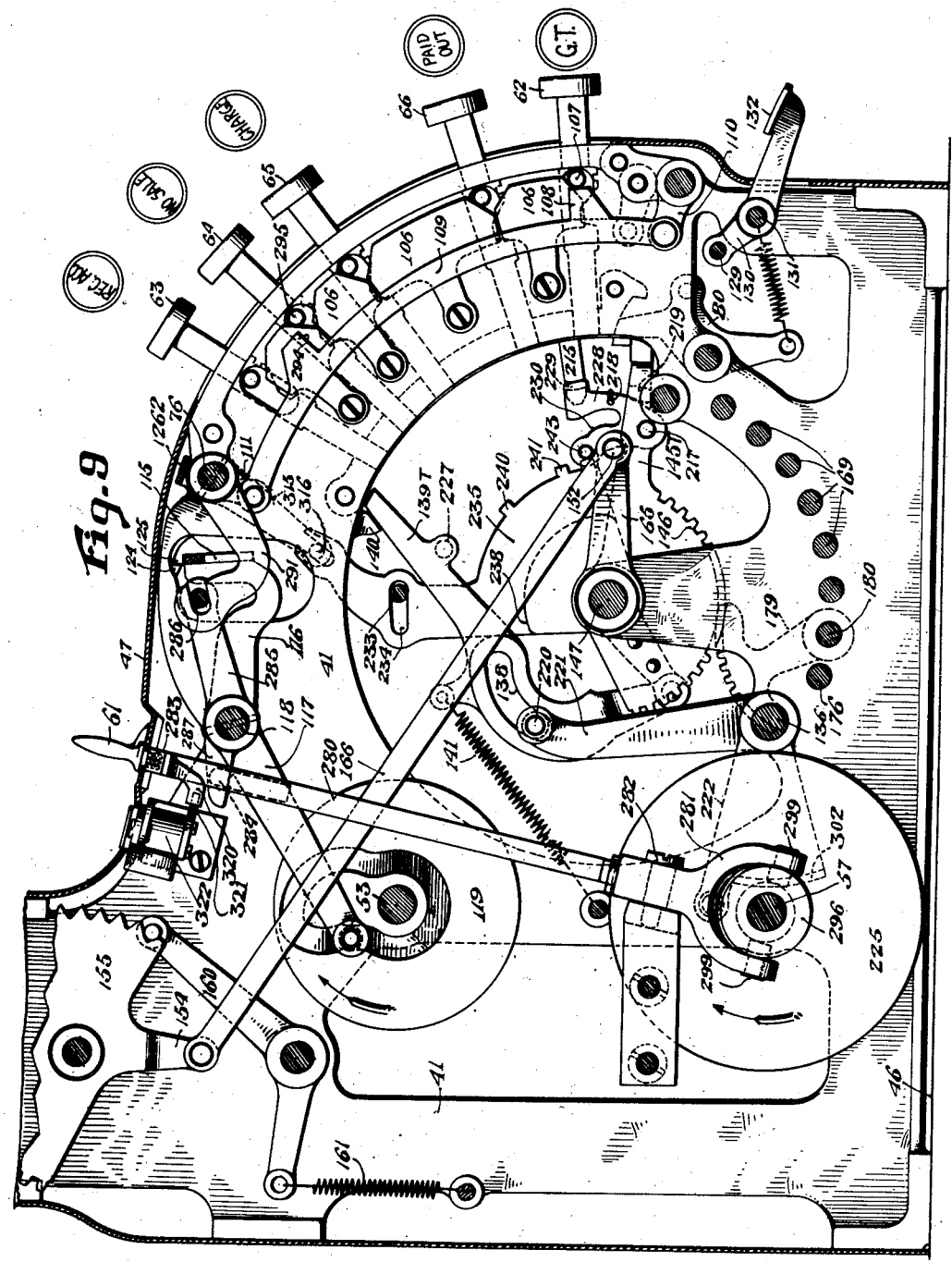
INVENTOR
ALLEN A. DICKE
BY
ATTORNEY July 21, 1936.   A. A. DICKE   2,048,060
CASH REGISTER
Filed Feb. 24, 1927   10 Sheets-Sheet 8
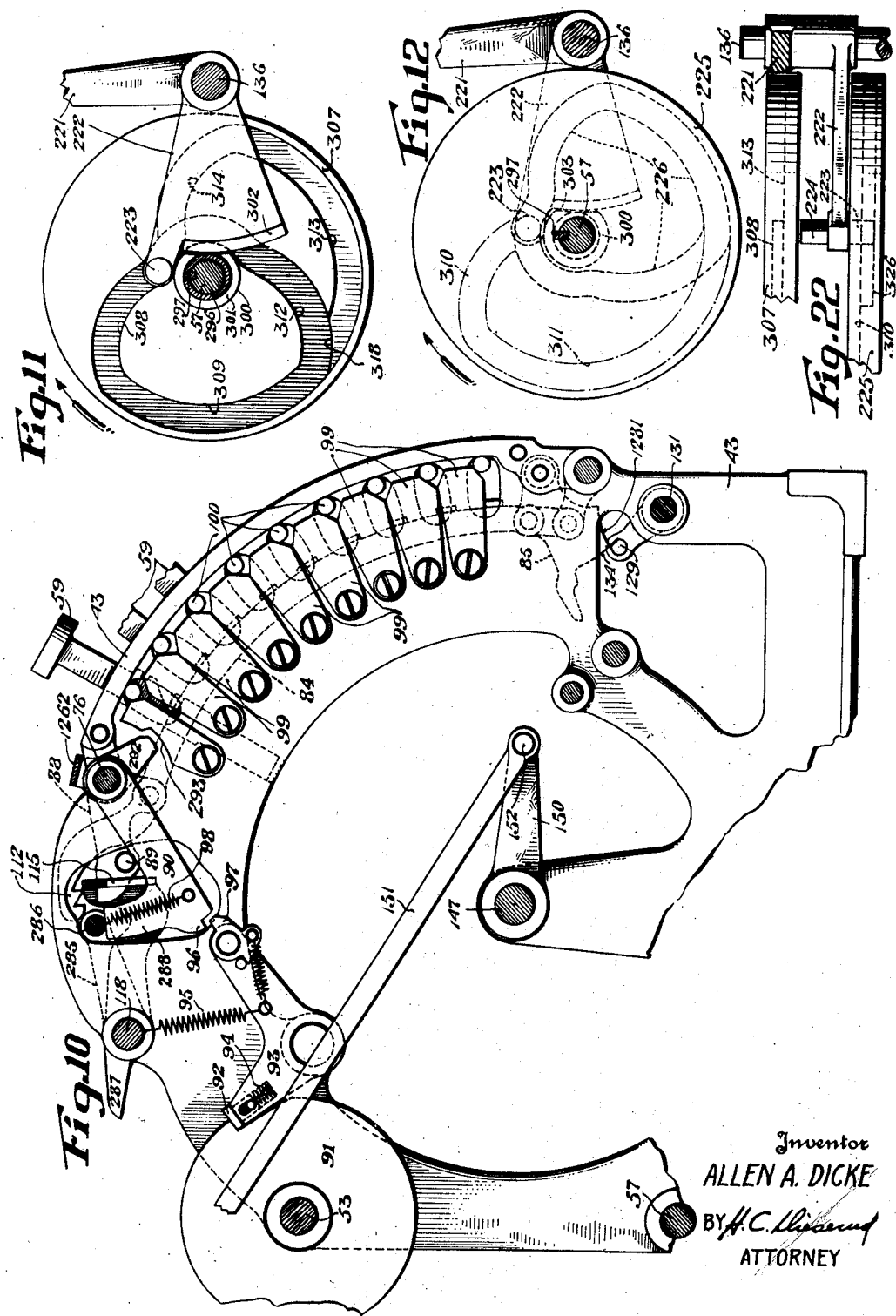
Inventor
ALLEN A. DICKE
BY H.C. [signature]
ATTORNEY July 21, 1936.  A. A. DICKE  2,048,060
CASH REGISTER
Filed Feb. 24, 1927  10 Sheets-Sheet 9
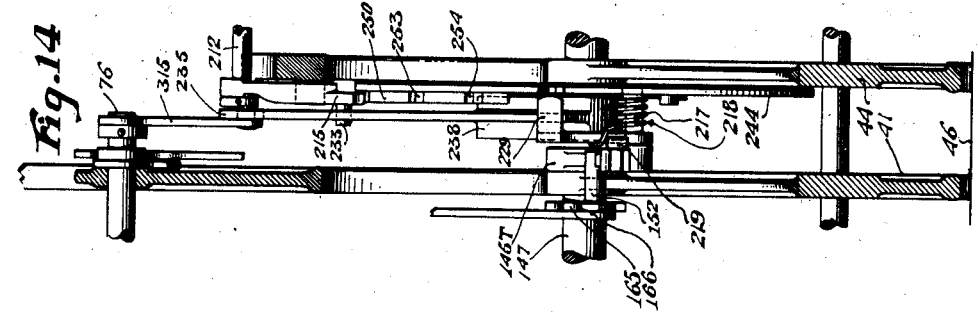
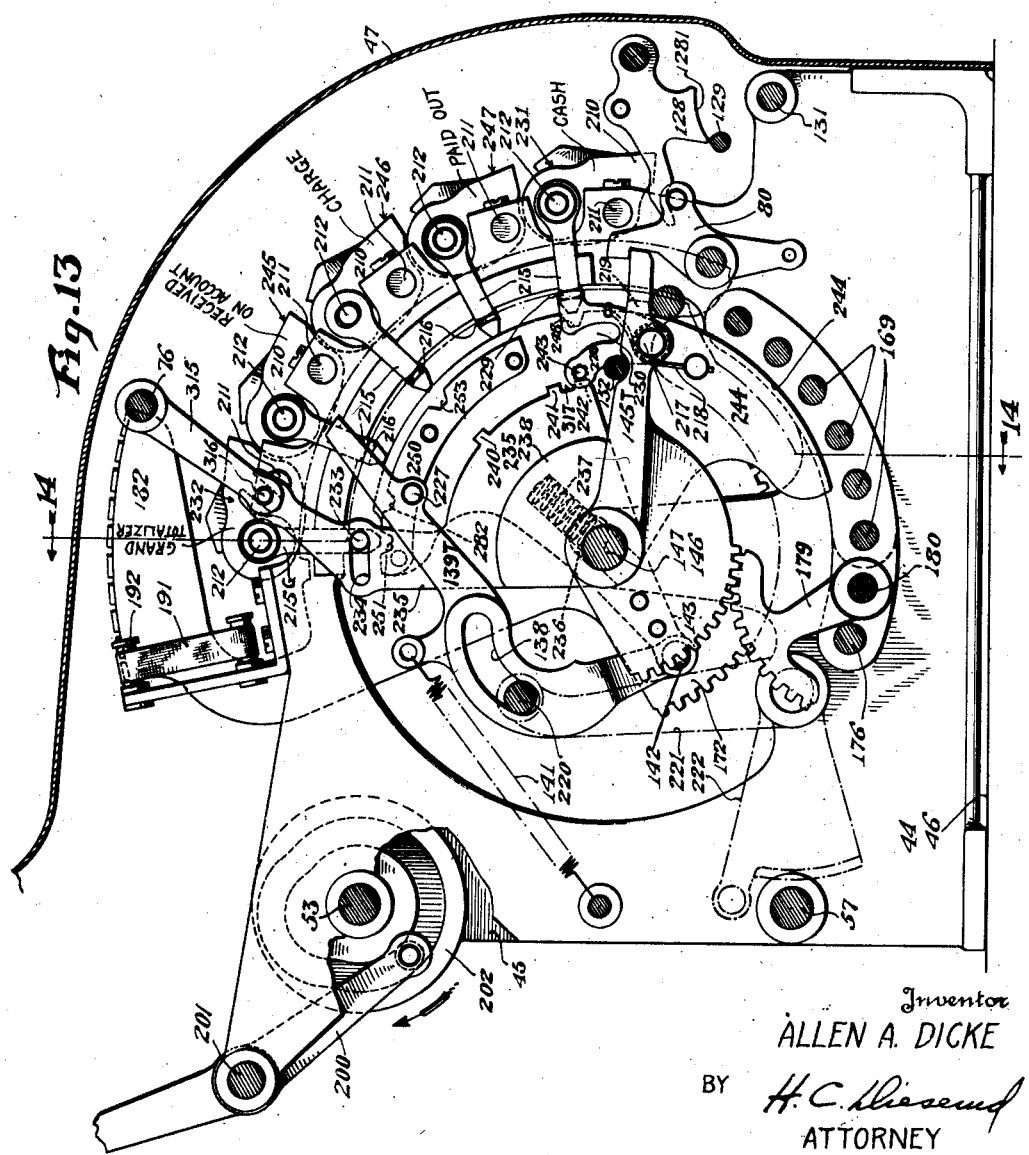
Inventor
ALLEN A. DICKE
BY
ATTORNEY

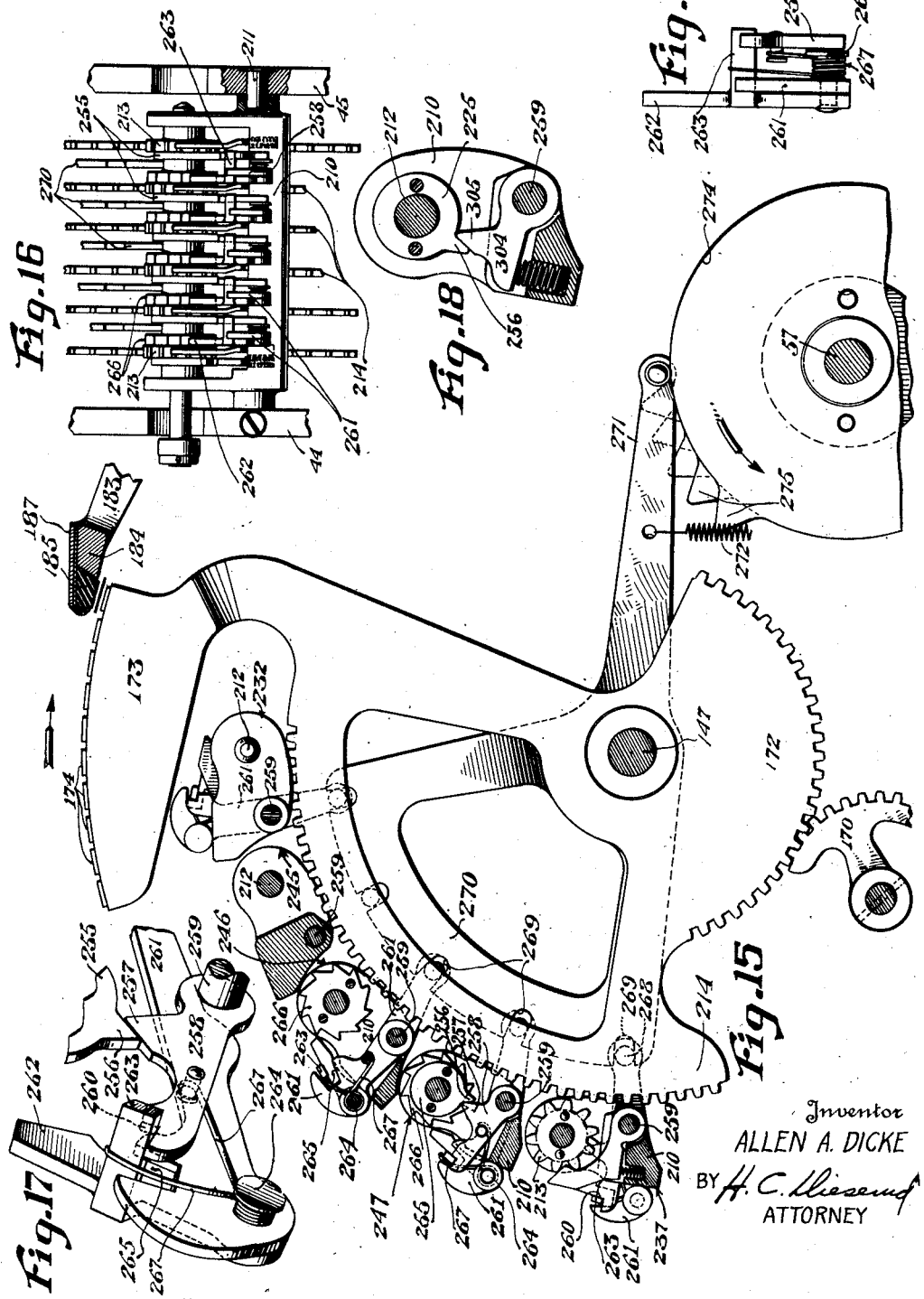

Patented July 21, 1936

2,048,060

UNITED STATES PATENT OFFICE 2,048,060

CASH REGISTER

Allen A. Dicke, Montclair, N. J., assignor, by mesne assignments, to The National Cash Register Company, Dayton, Ohio, a corporation of Maryland Application February 24, 1927, Serial No. 170,494

40 Claims. (Cl. 235—14)

This invention relates to cash registers and particularly to the type suitable for registering commercial transactions by entering the amounts of such transactions in suitable totalizer devices and for providing printed records of the items and totals of such transactions, it being broadly an object of the present invention to provide an improved mechanism for accomplishing the above functions, the inherent characteristcs of which are; simplicity in construction, reduction of number of parts, ease in manufacture of the component parts together with their assembly in the cash register.

One object of the present invention is to provide an improved type of differential mechanism which is simple in form but positive in its operation resulting in the correct addition of the amounts entered together with their indication and printing upon a record medium.

Briefly, the objects just stated which result from the improved design are accomplished in the preferred form of embodiment herein shown by providing two complementary movable levers, there being a pair of levers for each bank of keys, their extents of movement being determined by the key depressed in each bank. A universal operating member is provided for operating the levers of certain banks, the arrangement being such that the levers of one bank may be stopped in a different position than the levers in another bank so that the proper differential movement may be imparted to the related actuating racks. One of each pair of the levers is normally locked but when a key in the associated bank is depressed a detent is actuated to move a zero stop pawl of that bank out of engagement with the lever to permit movement of the latter by the common operating member.

In combination with the differential devices provided for the various classes of keys, there is provided a suitable indicating mechanism so co-ordinated with the differential devices that each indicator may be moved directly from one position to another without first returning it to an initial or normal position. The consequence of this is that the indicators and connected parts have their extents of movement greatly reduced thereby reducing the work to be done and diminishing the wear of these parts considerably.

It is also an object of the invention to provide an improved type of key detent mechanism which is simple in construction, but effective in operation, one of the detents, that of the clerk's bank of keys in the embodiment shown, being capable of releasing the machine for adding operations.

It is also an object of the invention to provide a plurality of individual totalizers for keeping separately the amounts of the receipts pertaining to the different transactions occurring in mercantile establishments in which the machine is intended to be used, and also to provide an improved type of mechanism for accumulating the "grand total" of the amounts entered in selected ones of the individual totalizers.

In connection with the totalizing devices it is broadly an object of the invention to provide an improved type of totalizer selecting mechanism, the differential mechanism employed to effect selection being similar in form and construction to that utilized in connection with the other banks of keys thus dispensing with the need of a number of special parts. The totalizer selecting devices are so designed that the totalizers are positively engaged and disengaged from the actuators thus dispensing with the necessity of having springs to return certain parts and insuring accuracy in the different operations of the machine. An improved locking mechanism is also provided whereby the totalizers may not be surreptitiously or accidentally operated.

The totalizer selecting devices are so arranged that an item will normally be entered in the "cash" totalizer the same amount being simultaneously entered in the "grand" totalizer. The amounts pertaining to other transactions are entered in the appropriate totalizer by depressing the related key and then operating the machine, the grand totalizer selecting device being so arranged that when items are entered in certain totalizer the "grand" totalizer will not be operated.

It is also an object of the present invention to provide an improved type of controlling mechanism whereby the machine may be normally conditioned for entering and printing items, but by the simple adjustment of a control lever the machine may be conditioned so that the totals standing upon any of the totalizers may be recorded. In conjunction with the total taking devices it is a further object of the invention to provide an improved mechanism whereby the machine may be released for one operation by simply adjusting the total lever out of the normal adding position. This simplifies to a great extent the operations of the machine permitting the totals to be obtained rapidly with a minimum of effort which is a desideratum in machines of this type. Subsequent total taking operations after the first are, in accordance with this invention, placed under the control of the transaction bank of keys. The construction is such, however, that this bank of keys has no control over the release of the machine when adding.

The machine is also provided with mechanism whereby the totals standing upon the individual totalizers may not only be recorded by whereby these totalizers may coincidentally be reset so that items pertaining to a subsequent period of business may be entered therein.

In connection with the total taking and resetting devices it is broadly an object to provide an improved type of mechanism which requires few parts but is effective in its operation. This, in the embodiment shown, comprises a plurality of cams which may be adjusted under control of the total lever so that the machine may be readily conditioned for entering items, reading (printing) totals or printing totals and resetting the totalizers, the cams being so arranged that the timing of the engagement and disengagement of the selected totalizers with the actuating racks may be changed, as required.

The present invention also comprises suitable interlocking devices between the different manipulative members so that misoperations, either intentional or accidental, may be minimized, thus eliminating the liability of errors. The interlocks are very simple thus precluding any possibility of their becoming out of order. A novel interlocking mechanism is provided between the error and operating keys, which, while the error key is being operated prevents the depression of any of the operating keys, and conversely after the machine has been released for operation locks the error key against manipulation. The machine is also equipped with a "single key" mechanism for preventing the depression of more than one key in a bank, this mechanism being so coordinated with the total control lever that when the latter is moved out of the "add" position the key stops will be locked against operation thus preventing any of the amount keys from being depressed. Furthermore, movement of the total lever out of the adding position will release any of the previously depressed amount keys. The "grand" total key in the illustrative embodiment is located in the bank of transaction keys and in normal item entering operations is locked, but when the machine is conditioned for totaling operations movement of the total lever out of the adding position is adapted to unlock the "grand total" key since the latter may be employed in total taking operations. A simple interlock is also provided for preventing movement of the total lever out of the adding position when a clerk's key has been operated to release the machine for operation. Improved devices are also provided for locking the machine against operation in the event that the total lever should be improperly adjusted and also whereby the total lever may not be moved out of its adjusted position when the machine has been partially operated.

With these and incidental objects in view the invention consists in certain novel features of construction and combinations of parts the essential elements of which are set forth in appended claims and a preferred form of embodiment of which is hereinafter described with reference to the drawings which accompany and form part of the specification.

Of said drawings:

Fig. 2 is a transverse sectional view taken through the machine showing a bank of amount keys, the differential mechanism associated therewith, and the common member utilized to lock and subsequently release the amount keys.

Fig. 3 is a view in side elevation of the zero stop disabling member for the differential devices of the fifth and sixth (overflow) banks.

Fig. 4 is a top plan view of the machine, the cabinet having been removed, showing the supporting frames, the total control lever and its connections to the releasing mechanism for the machine. This view also shows the arrangement of the printing segments and a number of the elements comprising the printing mechanism.

Fig. 5 is a transverse sectional view, somewhat similar to Fig. 2, but taken alongside of the clerks' bank of keys and showing in detail these keys and the associated differential mechanism.

Fig. 6 is a top plan view taken substantially above the central portion of the machine showing the arrangement of the key banks and the connecting shafts between the differential devices and the totalizer actuators and the printing segments.

Fig. 7 is an elevation of the right hand side of the machine showing details of the clerk's key bank, the multiple totalizers and the printing mechanism for printing items and totals.

Fig. 8 is a detail showing the operating crank and its connections to the various driving shafts.

Fig. 9 is a transverse sectional view of the machine taken to the left of the bank of transaction keys and showing in detail the different key locking devices and their connections to the total control lever.

Fig. 10 is a transverse sectional view taken at the left side of the clerk's bank of keys and shows in detail the releasing mechanism for the machine which is controlled by either a clerk's key or the total control lever.

Fig. 11 is a detail of the cam for operating the totalizer selecting mechanism during total taking operations.

Fig. 12 is a detail view of the cam which is a companion cam to that shown in Fig. 11 and shows particularly the arrangement of the cam slots effective during adding and reading total operations.

Fig. 13 is a transverse sectional view of the machine showing the totalizer selecting devices and their co-operation with the multiple totalizers.

Fig. 14 is a front elevation of some of the devices illustrated in Fig. 13.

Fig. 15 is a partial transverse sectional view showing the transfer arms, the arrangement of the multiple totalizers and the operating segments together with the arrangement of the printing segments and their relation to the printing platen.

Fig. 16 is a top plan view of one of the multiple totalizers showing the relation of its pinions to the operating segments and transfer arms.

Fig. 17 is a perspective view showing a number of elements associated with the transfer devices.

Fig. 18 is a detail sectional view showing the zero stop provided for the totalizing element of the highest denominational order of each totalizer.

Fig. 19 is a detail view of a number of elements comprising a part of the transfer mechanism.

Fig. 20 is a partial top plan view illustrating the devices whereby the control lever may release incorrectly depressed keys.

Fig. 21 is a detail of certain machine releasing elements which are effective during totaling operations.

Fig. 22 is a top plan view of the cams for effecting different accounting operations.

Figure 1:
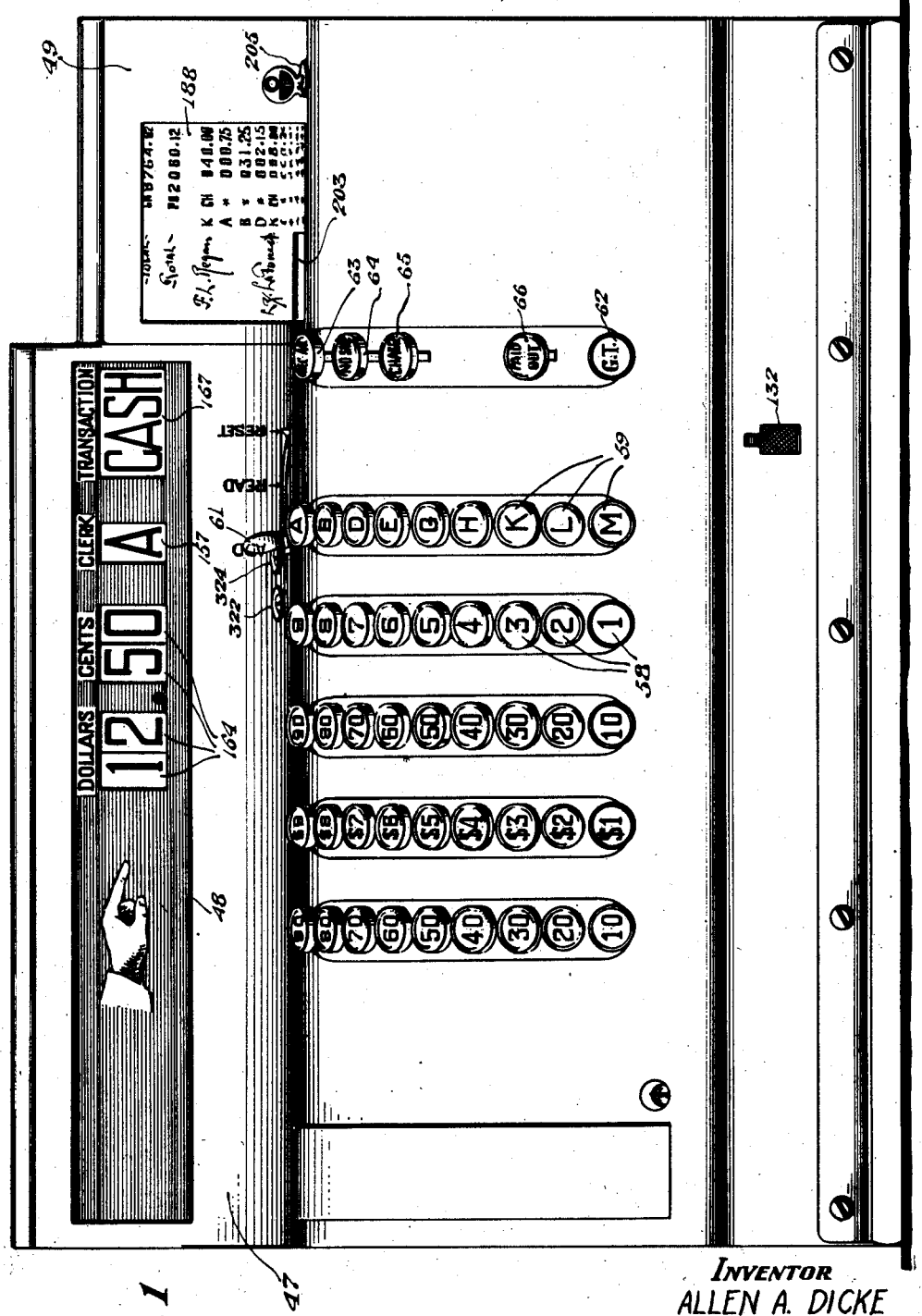
Fig. 1 is a front elevation of a machine embodying the invention showing the controlling keys and the total controlling lever. This view also shows the manner in which items are indicated and printed.

The machine herein disclosed includes various mechanisms, common in machines of this class namely; a driving mechanism, keyboard, differential mechanism, a grand totalizer, and a plurality of transaction totalizers, an indicating mechanism, and a printing mechanism here shown for printing items on a detail strip, but which may be employed equally as well for printing upon inserted slips or issued checks, and devices employed for the printing of totals.

The driving mechanism comprises two drive shafts with gear connections whereby these shafts may be caused to make one rotation by two rotations of a crank handle in either item entering operations or total taking operations. The driving shafts and crank handle are normally locked, but in item entering operations are released by the depression of one of a series of clerk's keys, while in total taking operations, since the clerk's keys are ordinarily not employed, connections are effected between the total lever and the releasing device of the machine so that movement of the total lever to certain positions will release the machine in exactly the same manner as clerk's keys do in item entering operations.

The keyboard comprises a total control lever, a plurality of banks of amount keys, one bank of clerk's keys, and a bank of transaction keys included in which is a "grand total" key which is locked against operation when the machine is conditioned for item entering operations.

The differential mechanism for each bank comprises in general a pair of levers which are positively moved complementary extents, the movement of the levers being governed by the key depressed. A pair of levers is provided for each bank of amount keys, clerks' keys and transaction keys, the amount and clerk's differential mechanisms being operated by a common member. One of the complementarily moved members of each bank is normally locked but is released by the zero stop pawl controlled by the detent plate of that bank. One of the levers which is moved differentially commensurate with the key depressed has integral therewith a segment rack plate having a connection to a member provided with a rack portion for actuating the desired totalizer and also simultaneously adjusting a printing segment. In this manner a differential movement is imparted to each totalizer actuating rack so that by its co-operation with the corresponding pinion of the selected totalizer it will actuate the totalizer element differentially during the return stroke of the actuator. Only the amount differential devices are utilized to actuate the totalizer pinions, while these differential devices as well as those associated with the transaction and clerk's key banks are utilized for the purpose of differentially adjusting related type carriers and indicators. By suitable connections the type carriers are set differentially under control of the keys depressed when items are entered, or of the totalizers when totals are printed, which of these controls is active being determined by movement of the control lever to a selected position.

In respect to the printing section of the machine, there is provided an inked ribbon, a paper strip, and a platen all operating in a well known manner.

An indicating mechanism is also provided in which the indicators are each connected to one of the differential devices of the machine and all are so arranged as to be moved from one reading position directly to another without being brought to a constant position. The illustrative machine is shown equipped with only one set of indicators for indicating at the front of the machine, amounts, letters representing the clerk's, and legends denoting the transaction entered in the machine, but if so desired a duplicate set of indicators may be provided whereby the same information may be read at the other side of the machine.

In order to accumulate the amounts entered in the machine the illustrative embodiment is provided with a plurality of individual transaction totalizers the frames of which are so mounted that their pinions may be brought directly into co-operative relationship with the actuators which in turn are controlled by the banks of amount manipulative devices, such as, keys. For the purpose of selectively operating any of the transaction totalizers, which, in the machine shown, are appropriated to each of the transaction keys, and one for normally receiving "cash" entries, the differential devices associated with the transaction bank are provided. While in the machine shown the totalizers are allotted to the different transactions they may, if desired, be utilized to segregate the sales pertaining to the different departments, or clerk's, etc. A grand totalizer is also provided and the elements of this totalizer may be moved into engagement with the actuating racks each time certain of the transaction totalizers are rocked into engagement with the actuators. Provision is also made whereby when an amount is entered in either of the totalizers appropriated to the "paid out" and "received on account" keys this amount will not be entered in the "grand" totalizer so that the latter will only accumulate amounts representing the amount of new sales performed during an arbitrary period.

A manipulative device forming a part of the total recording mechanism is capable of being adjusted to three different positions. This manipulative device when in its normal position controls the mechanism so that the items may be entered upon the various totalizers. When this device is in a position designated "read" the totals standing upon any of the transaction totalizers or the "grand" totalizer may be obtained (printed and/or indicated) without resetting the totalizer. Taking of the total standing upon the "cash" totalizer is effected by simply moving the total lever to the "read" position, and since this releases the machine for operation, the crank handle may be turned which will result in printing the amount standing on the "cash" totalizer upon the record strip and indicating it if desired. Printing totals from the "grand" totalizer and the remaining transaction totalizers is performed by depression of the related key followed by a subsequent operation of the crank handle. Depression of the "grand total" key or one of the transaction keys serves to release the machine during totaling operations only and for the first totaling operation no key need be depressed so that the total of the "cash" totalizer may be automatically taken.

When the machine is conditioned for total taking by movement of the manipulative device to the "read" position the timing of the engagement of the totalizer pinions with the actuators will be so regulated that the desired totalizer will be moved into and out of mesh with the actuating segments for the purpose of permitting the segments to rotate the totalizer elements in both directions thus permitting the amount to remain on the totalizer.

When the total lever is moved to the position designated "reset" the machine is conditioned so that the recording of the total of any of transaction totalizers and the "grand" totalizer may be permitted along with the resetting of the totalizer, and in this instance, the totalizers are moved into mesh with the actuating segments for permitting the segments to rotate the totalizers in only one direction so that after the amount standing upon the seleced totalizer has been subtracted therefrom the totalizer will then be disengaged from the racks and the totalizer pinions will remain in their zero positions.

In addition to the above described devices the machine is also provided with an error key whereby in the event that an error should have been made in the depression of one of the keys in the amount or transaction banks, the same may be rectified without a further operation of the machine. The error or release key is so arranged in co-operation with the clerk's bank of keys that it may not be operated after the machine has been released for operation by the depression of a clerk's keys. Furthermore, in order to insure proper operations of the machine various other interlocks and cross connections are provided for the following purposes: to prevent movement of the total lever out of its adjusted position after the operation of the machine has commenced; to effect the release of any of the previously depressed amount or transaction keys prior to a movement of the total control lever to the "read" or "reset" position; for normally locking the "grand" total key when the machine is conditioned for item entering operations and for releasing it when the control lever is moved out of the adding position, and simultaneously locking the "no sale" key since the latter is not employed in total taking operations. The usual form of key stops are provided for preventing the depression of more than one key in a bank and connecting mechanism is employed for locking the amount and clerks' keys when the total lever is moved out of the adding position.

The general organization and operation of the machine as a whole having been thus outlined, the preferred construction of the various parts above referred to will now be described in detail.

Framework

Figs. 4 and 6 disclose the relative arrangement of some of the members comprising the framework of the machine from which it will be noted there are provided two main side frames 40 and 41 between which are parallel intermediate frames 42 which, at their front portions comprise the supporting means for the amount keys and associated devices. In addition to these frames there is also provided a parallel frame 43 which is the supporting means for the keys associated with the clerk's bank of keys, while the frame 41, in the present instance, is the supporting frame for the transaction bank of keys. In order to give strength and rigidity to the framework the various members are held together by means of transverse shafts which, may at the same time, either serve as the operating shafts for the machine or supporting means for some of the elements. To the right of the frame member 41 are parallel frame members 44 and 45 which are provided for the purpose of supporting the totalizing and printing devices. All of the frame members just referred to rest upon and are attached to a base 46 (Fig. 5). As best shown in Fig. 1, the machine is enclosed by a cabinet 47 which may be made of any desired material, the cabinet being provided with a series of slots to receive the operating keys and total controlling device and being furthermore apertured at 48 at its upper end to permit viewing of the indicators which have been brought to the reading line. The printing and associated mechanisms are concealed by means of a hinged cover 49.

Operating mechanism

To impart power to the various mechanisms of the machine, the machine may be equipped with a manually operated crank handle 50 (Figs. 4 and 8) which is loosely mounted upon a stub shaft attached to the frame 45, the handle having attached to it a gear 51 meshing with a larger gear 52 attached to a driving shaft 53. The latter gear 52, which is twice as large as the gear 51, meshes with an idler gear 54 loosely mounted upon a stud 55 also projecting from the frame member 45. The gear 54 meshes with a gear 56 (similar to the gear 52) which is rigidly mounted upon a second driving shaft 57. The shafts 53 and 57 are the driving shafts of the machine and they carry cams and other devices for operating the various parts of the mechanisms as will be described in detail hereinafter as the specification progresses.

The drawings show the machine as it would appear when provided with a manually operative crank for the purpose of operating it, but it is also intended that the machine may be provided with an electric motor and clutch to connect the motor with either of the driving shafts 53 or 57 and for this purpose any well known electric driving device may be utilized.

Keyboard

The keyboard in the illustrative machine, as best shown in Fig. 1, comprises four banks of amount keys 58 which permits the entry of amounts as high as $99.99. There is also provided a single bank of "clerks'" keys 59 and a series of four keys, 63, 64, 65, and 66, comprising a bank of "transaction keys". There is also provided a total control lever 61 above the clerks' keys and a special key 62, located in the transaction bank but designated as a "grand total" key; both of these manipulative devices may be active for controlling the machine when performing certain totaling and resetting operations. Attention is called to the fact that in the transaction bank there is provided a "received on account" key 63, a "no sale" key 64, a "charge" key 65 and a "paid out" key 66 for designating the usual transactions other than cash sales occurring in mercantile establishments.

Amount keys

The construction and the mounting of each of the amount key banks 58 are identical, the bank illustrated in Fig. 2 being taken as representative of these four banks. The stems of the amount keys 58 fit in radial slots formed in their associated supporting frame 42, the stem of each key being surrounded by a spring 68, which is employed to retain and return the key to its outer or normal position. Each key is provided with an inclined edge 69 and a notch 70 adapted to co-operate with laterally extending lugs 71 integral with a key detent 72. The detent 72 of each bank is supported at its lower and upper ends respectively, by arms 73 and 74, the arm 73 being pivoted to the key frame by a screw 75, while the arm 74 is loosely pivoted upon a transversely extending rod 76. Each detent 72 may serve to temporarily retain a key in its bank in depressed position, since it will be obvious that when a key is depressed the inclined edge 69 engaging the lug 71 will rock the detent 72 downwardly until the key has been depressed sufficiently to bring the lug 71 into co-operation with the notch 70, and since the detent 72 then springs slightly upwardly under the action of a connected spring 77, the lug 71 will engage the notch 70 of the key and hold the latter depressed against the compression of the return spring 68.

The arm 73 is provided with a rearward extension 78 engaging the pin 79 carried by a zero stop pawl 80 so that when the detent is lowered the engagement of the extension 78 with the pin 79 will disable the zero stop pawl 80 for the differential mechanism, and since the key will be held in locked position the zero stop pawl 80 will be retained in its disabled position as long as the key is held depressed.

Clerk's keys

The bank of special clerk's keys 59 is shown in Fig. 5, and while it is constructed somewhat similar to the key banks already described, it nevertheless contains an element, not found in the amount key banks, through the medium of which it is capable of an additional function. The keys 59 of this bank are mounted in the frame 43 and by reference to Fig. 1, it will be seen that these keys reading from the top, bear upon their projecting operating heads initials, "A" to "M" inclusive, representing the different clerks employed in the establishment for which the machine is designed. It is apparent that whenever desired, a lesser number of keys might be placed in this bank generally determinable by the number of clerks who are to use the machine.

All of the clerk's keys are, similarly to the amount keys, provided with inclined edges 82 (Fig. 5) as well as notches adapted to co-operate with lugs 83 carried by a detent plate 84 which, at its lower end is pivoted to an arm 85 whose extension co-operating with the pin 86 disables a zero stop pawl 87 just as described in connection with the amount key banks. The upper end of the detent plate 84 is carried by an arm 88 the latter carrying a pin 89, which as shown in Fig. 4, extends laterally a sufficient distance to overlie an arm 90 loosely mounted on the shaft 76. The clerks' keys have the additional function of releasing the machine and the machine cannot be operated by the crank handle for entering items unless one of these keys is depressed. The clerks' keys in addition to being releasing keys for the machine also control an indicator and type wheel by means of a differential mechanism as will hereinafter be described, and it is sufficient here to state that no one can operate the machine without depressing a clerk's key and by means of the indicating and printing mechanism the necessary information is given as to which clerk's key has been employed to release the machine.

Machine lock

The means whereby the crank handle is normally locked against operation but released upon depression of one of the clerk's keys is best shown in Fig. 10. Referring to this figure, it will be noted that secured to the driving shaft 53 is a disk 91 provided with a shoulder normally engaging a lug 92 of an element slidably mounted in a bell-crank 93, the lug 92 being normally urged into co-operative relationship with the shoulder of the disk 91 by means of a spring 94 and a spring 95 connected to the bell-crank 92. As previously stated, the arm 90 is loosely mounted on the shaft 76 and is provided with a shouldered portion 96 adapted to co-operate with a spring-pressed pawl 97 carried by the bell-crank 93. A spring 98 urges the arm 90 against the stud 89.

From the construction just described, it will be self-evident that when a clerk's key is depressed the pin 89 will rock the arm 90 counter-clockwise as viewed in Fig. 10 so that the shouldered portion 96 co-operating with the pawl 97 will rock the bell-crank 93 clockwise against the tension existing in the spring 95. This will result in the disengagement of the lug 92 from the shoulder of the disk 91 so that the spring 94 will urge the lug 92 upwardly enough to carry it out of line with the shoulder on the disk. When the shoulder 96 is disengaged from the pawl 97 the spring 95 will be effective to rock the bell-crank reversely so that the lug 92 rests upon the periphery of the disk thus leaving the shaft 53 and crank handle unlocked for operation.

Transaction key bank

As previously stated the transaction keys 63, 64, 65, and 66 and the "grand total" key 62 are all located in one bank and as shown in Fig. 7, each of the key stems is provided with an inclined edge 101 and a notch 102 adapted to engage a lug 103 integral with a detent plate 104, similar to the detent plates 72 and 84 described in connection with the amount and clerks' key banks. By this means the keys are held temporarily depressed and when any key is depressed a zero stop pawl 80 (Fig. 9) is disabled in the usual manner.

Single key mechanism

It is desirable to provide means to prevent a depression of more than one key in a bank since this would probably result in the disarrangement of the mechanisms and a confusion in the printed record and indication. To this end there is loosely pivoted upon the clerks' key supporting frame 43 (Fig. 10) a series of key stops 99 of the usual form adapted to co-operate with pins 100 carried by each of the stems of the clerks' keys. The pendants 99 are so placed and so arranged that sufficient room is provided to permit the passage of only one of the pins 100 of one of the key stems, so that when a key in one bank is depressed the upper edges of the pendants will by engagement with the pins 100 of the undepressed keys lock them against operation.

A somewhat similar construction is provided for each bank of amount keys 58 and while this mechanism has only been shown and described in connection with the clerk's key bank, it is to be understood that the construction shown and described should be taken as representative of all the amount key banks as well.

Intermediate the five keys of the transaction bank are also located key stops 106 (Fig. 9) which serve in the usual way to prevent depression of more than one key in this bank. Attention is directed to the fact at this time that the "grand total" key 62 is equipped with a pin 107 which normally in item entering operations is in locking relationship with a projection 108 of a plate 109 pivoted at its lower end to the transaction bank key frame by an arm 110 and pivoted to the transaction key bank frame at its upper end by an arm 111 secured to the shaft 76.

Lock for operating keys

After the machine has been released and partially operated it is desirable to lock all the keys in all banks of the machine during the operation of the machine, this applying not only to banks in which keys have been depressed but in banks in which no keys have been operated.

As best shown in Fig. 2 the detent plate 72 associated with the amount key bank is provided with an upward extension 112 provided with adjacent notches 113 and 114 which are adapted to co-operate with a bail member 115. As best shown in Fig. 4, the bail 115 comprises a transversely extending bar attached at opposite ends to a pair of bell-cranks 116 and 117 loosely mounted at their mid-portions upon a transverse shaft 118. The rearward arms of the bell-cranks 116 and 117 are provided with rollers engaging the cam slots of box cams 119 (see Figs. 2 and 9) attached to the driving shaft 53. To provide strength and rigidity to the frame the bail 115 at its mid-portion has attached to it an arm 120 (Fig. 4) which is also loosely mounted upon the shaft 118.

As will be noted in Fig. 5 the detent 84 associated with the clerk's key bank is likewise provided with a rearward extension 122 having adjacent notches 123 also adapted to co-operate with the bail 115, and similarly referring to Fig. 9, the detent associated with the transaction bank is provided with an extension 124 having adjacent notches 125 also adapted to co-operate with the bail 115.

It will be obvious that when a key is depressed the detent of that particular bank will be forced downwardly thus bringing the rearmost notch into position for co-operating with the bail 115, but if the key in any bank has not been depressed, the detent, will, of course, remain in its normal position at which time the bail 115 will be in co-operative relationship with the foremost notch. When the machine is partially operated the cam slot in the cam 119 will rock the arms 116 (Fig. 2) slightly downwardly thus raising the bail 115 so that it will engage either the foremost or rearmost notch thus holding all the detents in locked position and thereby preventing a depression of additional keys or release of those depressed in the different banks.

The above makes it clear that the amount keys may be depressed in conjunction with any desired transaction keys, and that upon a depression of one of the clerk's keys the machine is released so as to permit actuation by the operating mechanism, and that by a partial movement of the latter all keys in all the banks are locked against operation.

Release of the keys at the end of an operation of the machine by the operating mechanism It is, of course, necessary to release those keys which have previously been depressed and in the illustrative embodiment the release of the keys is effected by the same member which locks them during an operation of the machine. Loosely mounted upon the shaft 76 is an arm 126 (Fig. 2) which is adjacent the detent plate of the amount key bank, and is connected to the upper end of the detent 72 by a pin 127 which is used as the connecting means between the arm 74 and the detent. If desired, the arm 126 may be formed as an integral extension of the arm 74. By the connection just described, it will be noted that when the detent plate is moved downwardly by the depression of a key the arm 126 also moves downwardly. At a certain point in the operation of the machine the box cam 119 will give a downward movement to the bail 115 so that it strikes the arm 126 and rocks the detent 72 downwardly sufficiently to disengage the lug 71 from the notch 70 of the depressed key and permit the key spring 68 to return the key to its normal position.

As shown in Fig. 4, a series of arms 126 are provided, one for each bank of amount keys. In respect to the clerk's key bank the arm 88 which, it will be remembered, is part of the train of mechanism for releasing the machine for operation, also lies under the bail 115 and serves to release the depressed clerk's key at the end of an operation of the machine in the same manner described for the amount keys. In respect to the transaction key bank, the arm 126³ likewise lies under the bail 115 and performs the same function.

As previously stated, the arm 90 (Fig. 10) is moved by the pin 89 a sufficient extent to cause the shoulder 96 to escape the shoulder on the pawl 97 so that spring 95 may rock the bell-crank 93 and cause the projecti 1 92 to rest on the periphery of the disk 91. As the arm 90 is now permitted to rise upon the release of the clerk's keys it will merely rock the pawl 97 idly about its pivot until the shoulder 96 is again above the shoulder on the pawl. The construction just explained serves to prevent an operator from holding the locking bell-crank 93 in released position by accidentally or intentionally holding the clerks' key depressed at the moment when it should be released and returned to normal.

Error key

An improved type of a key releasing device is employed whereby if the operator should depress a key in error the same may be returned to its normal position without requiring an operation of the machine.

Each arm 73 which is connected to an amount key detent 72 has an integral extension 128 (Fig. 2). When an amount key is depressed and latched the extension 128 will be located in front of a rod 129 which as shown in Fig. 6 extends transversely of the machine and is supported by arms 130 rigidly attached to a horizontal transverse shaft 131 to which is attached a key lever 132 which as shown in Fig. 1, projects through the machine cabinet so as to be exteriorly operable. When the error key 132 is depressed the shaft 131 will be rocked counter-clockwise (Fig. 2) so that by the co-operation of the rod 129 with the extensions 128 of the detent plate supporting arms which have been operated by virtue of depression of certain keys in various banks, the detents will be rocked still further downwardly and disengage the lugs 71 from the notches 70 of the depressed keys thus permitting the key return springs 68 to return the keys to their normal positions.

Substantially the same form of releasing connection between the key lever 132 and the detent associated with the transaction bank of keys (see Fig. 7) is provided so that if a key in this bank should have been depressed in error the mistake could be rectified prior to a further operation of the machine by the crank handle, it being understood that the rod 129 is of sufficient length to engage the extensions 128 related to the amount and the transaction key banks.

It is advantageous to lock the keys of the banks in which no keys are to be returned while the error key is operated. To this end the extensions 128 related to the amount and transaction banks as well as the corresponding extension 133 for the clerk's bank have their lower edges 1281 concentric with respect to the shaft 131. While the error key is being operated the rod 129 will co-act with these concentric edges to lock the extensions and detents of the unoperated banks against movement by the depression of a key until the error key is returned to normal.

It will be noted, however, from an inspection of Fig. 5, that the extension 133 which is integral with the arm 85 connected to the clerk's detent 84 is different from the corresponding extensions 128 of the amount and transaction key banks. The extension 133 is in the case of the clerk's key bank provided with an edge 134 which is concentric with respect to the pivotal point 75 of the arm 85 so that when a clerk's key has been operated to release the machine for operation the concentric edge 134 will pass in front of the rod 129 thereby locking the shaft 131 against counter-clockwise movement by depression of the error key 132. Thus it will be noted that any fraudulent operations of the machine, such as the release of the keys after the machine has been released for operation will be completely prevented.

The result of the construction just described is that should a mistake be made in the depression of the keys in the machine the same may be corrected before the machine is released for operation by manipulating the lever 132, but after the operating handle has become unlocked the error key becomes locked, so that the keys may not be released except by completing the operation of the machine, permitting the regular release of the keys through the bail 115 and arms 88, 1263, and 126.

Differential mechanism

The differential mechanism of the machine is employed to operate the totalizers, to select them for operation, and also set the type carriers in the printing mechanism and the indicators in the indicating mechanism under the control of the banks of amount, transaction and clerks' keys.

The differential mechanism controlled by the amount keys comprises a plurality of sections one of which is provided for each bank of keys 58 and is clearly shown in Fig. 2. As shown there is attached to the driving shaft 57 a box cam 134 the cam slot of which cooperates with a roller carried by the rear arm of a bell-crank 135 loosely mounted on a transverse shaft 136. It will be noted that in Fig. 6 that the shaft 57 carries two cams 134 identical with each other, each of which co-operates with its associated bell-crank 135 and between the ends of the bell-cranks is extended a universal bar or rod 137. The configuration of the cam slot in the cam 134 is such that when the shaft 57 is rotated in the direction of the arrow shown in Fig. 2, the bell-crank will remain substantially stationary for a partial movement of the shaft 57 and the cams 134, after which the cam slot is effective to rock the bell-crank 135 and rod 137 forwardly to a gradually increasing extent and after the maximum movement has been given to the rod 137 the latter will remain substantially stationary during another portion of the continued movement of the shaft and cam 134. The movement given to the rod 137 during the remainder of the movement of the shaft and cam 134 is substantially a counter-part of the first portion of the movement. This will result first in holding the rod shifted and then giving it a return slightly beyond its normal position and finally after it has remained substantially idle for a while, it will be brought to normal. The return movement of the rod serves to actuate the differential mechanism of the machine which will now be described in detail.

The universal rod 137 is adapted to co-operate with a cam slot 138 formed in a floating lever 139, the forward end of which is adapted to co-operate at the desired time with the stem of the depressed key, but it is normally retained in the position shown in Fig. 2 abutting against the projection 140 of the frame 42 by means of a spring 141. The lever which is in the form of a cam member is pivoted by means of a pin 142 to an arm 143 which is secured by means of pins 144 to a complementally movable lever 145 which has integral therewith a segment plate 146 loosely mounted upon a fixed pivot 147 which in the illustrative embodiment comprises a transverse supporting shaft mounted in the various side and intermediate frames in the central part of the machine. The forward end of the lever 145 is normally in engagement with the lower edge of a nose 148 projecting from the zero stop pawl 80 while the forward end of the lever 139 is normally in such a position that when the uppermost key, which is the key of the highest value in the bank is depressed it is substantially in contact with the rear side of the inner end of this key.

The operation of the differential mechanism is as follows: When a key is depressed the zero stop pawl 80 is rocked forward so that its nose 148 is carried out of engagement with the shoulder of the lever 145 and, as previously described, the zero stop pawl will be retained in its disabled position. When the crank handle is operated the shaft 57 is rotated and such movement of the shaft will rock the bar 137 about the pivot shaft 136 and this movement of the rod is adapted to move the members 139 and 145 complementally, the extent of movement imparted to each member being dependent upon the key depressed. The spring 141 will be given sufficient tension to hold the lever 139 at normal until the companion lever 145 has been moved. When the shoulder of the lever 145 engages the inner end of a depressed key further movement of that lever is prevented and movement of the lever 139 continues until its shoulder engages the inner end of the depressed key. For example, if the eight key has been depressed the inner end of the stem of that key will be moved in the path of the complementally moved members 139 and 145 and as the machine is operated the rod 137 may first cause the lever 145 to pivot around the shaft 147 and move its outer end upwardly until its shoulder engages the stem of the depressed key. During this movement the member 139 tends to pivot about its upper end in contact with 140 so that the pin 142 serves to transmit the motion of rod 137 to arm 143. As the rod 137 continues its movement around the pivotal point 136 it cannot impart a further upward movement to the lever 145 due to the contact of the latter with the end of the depressed key so that the rod will now by its co-operation with the lower edge of the cam slot 138, cause the lever 139 to be rocked counter-clockwise about its connection 142 with the arm 143 until the shoulder of the lever 139 engages the rear or upper side of the eight key. The movement which is given to the segment plate 146 and lever 145 will, therefore, be of eight units in length while a complementary movement of one unit will be given to the member 139. When a "4" key is depressed the segment plate 146 will be given four steps of movement and the cam lever 139 will be given five steps of movement. If the machine is operated with no key in the bank depressed the zero stop pawl for that bank remains in operative relationship with the lever 145 so that the latter will not move while the cam lever 139 will be given nine steps of movement. This, of course, will merely result in rocking the cam lever 139 downwardly about its pivotal point 142 during the first half of the operation of the cam 134 and returning it during the second half of the operation with a result that no movement will be given to the segment plate 146. At the end of the first half of the operation the parts will be in the position shown in dotted lines in Fig. 2.

Summarizing therefore, it will be noted that the segment plate 146 will be given a differential movement during the first part of the operation of the machine and it will then return the same differential distance, during the last half of the cycle of operation, these movements being utilized to adjust indicators and printing segments and to operate the totalizing mechanism as will be described hereinafter in detail.

Attention is called to the fact that the formation of the cam slot 138 in the floating lever 139 is such that when the two members 139 and 145 are brought together on opposite sides of the depressed key (or of the nose 148 of the zero stop pawl 80) the curvature of the slot 138 will be concentric with the fixed pivot of the rack plate 146. Furthermore, at this time the concave forward edge 1391 (Fig. 2) of the member 139 will always be brought into contact with the hub portion of the segment 146.

As will be noted in Fig. 6 there is provided a differential mechanism of a type identical to that just described, for each bank of amount keys, the same reference characters being applied to like parts. To the left of the hundreds of dollars bank of amount keys are two differential mechanisms for which no depressible keys are provided. The differential mechanisms of these two orders are utilized for the purpose of total taking and resetting thus permitting the indication and printing of amounts higher than that represented by the keys.

A differential mechanism of substantially the same construction is also provided for the clerk's bank of keys and is best shown in Fig. 5, the differential mechanism being utilized to adjust the clerk's type carrier as well as an indicator, differentially, as will be described in detail hereinafter.

The elements comprising the differential mechanism associated with the transaction bank of keys are best shown in Fig. 13 and their differences over the corresponding elements of the amount differential will be pointed out later. The transaction differential is not only utilized for the purpose of adjusting an indicator and a type carrier differentially, but for selecting a totalizer for operation.

The manner in which the various differential devices adjust their associated indicators differentially will now be described in detail.

*Indicator mechanism*

Referring to Fig. 5 which shows the differential mechanism and indicator associated with the clerk's bank of keys, it will be observed that loosely mounted upon the shaft 147 is an arm 150 which is connected to a rearwardly extending link 151 by means of a pin 152 and while the arm 150 and link 151 are mounted adjacent the rack plate 146 the pivot pin 152 extends laterally a sufficient extent (see Fig. 6) to co-operate with notch 153 formed in the complementally moved member 145 and with the member 139. The rearward end of the link is connected to an extension 154 of a segment plate 155 provided with teeth engaging a pinion 156 secured to a rotatable indicator 157 carrying characters upon its periphery representing clerks these characters being visible through a glass 158 carried by the machine cabinet. The segment gear 155 is provided with aligning notches 159 co-operating with a spring-pressed pawl 160 so that the pin carried by the pawl 160 is urged into co-operation with the notches 159 by means of a spring 161.

When the complementally moved members 139 and 145 are moved as has been described hereinbefore, the notch 153 formed in the lever 45 engages the pin 152 and positively moves the arm 150 until the pin 152 is in engagement with the forward arm of the other complementally moved lever in which position both levers 139 and 145 engage the depressed key. Which of the levers is to pick up the pin 152 depends, of course, upon the key depressed and also upon the position of the arm 150 at the beginning of the operation of the machine. As the arm 150 is connected to the actuating segment 154 by the link 151 it can be seen that the movement of the arm 150 from one adjusted position to the other rotates the indicator 157 directly from one indicating position to the other without restoring the indicator to a constant position. As the rack plate 155 is moved from one position to the other, the pin carried by the pawl 160 will ratchet over the teeth 159 it being understood that the spring 160 has sufficient tension to hold the indicator in any adjusted position between operations of the machine where it will exhibit a letter indicating the clerk's key depressed during the preceding operation of the machine.

In order to indicate the amounts registered the differential devices associated with the amount key banks, as best shown in Fig. 2, are also provided with arms 162 and links 163, similar to arm 150 and link 151, and are adapted to differentially adjust the amount indicators 164, best shown in Fig. 1, so that at the end of the operation of the machine the amount registered will be indicated at the front of the machine.

Attention is directed to the fact that in the drawings while the differential devices are provided for the thousands and tens of thousands dollars orders, indicators are not provided for these banks since they are beyond the capacity of the keyboard. Obviously the same sort of connections could be provided to suitable indicators for these banks as well if desired for purposes of indicating totals, as will be explained.

In order to indicate the type of transaction entered in the machine, the differential device associated with the transaction keys is adapted to differentially adjust an arm 165 and through the link 166 (Fig. 9) differentially adjust the transaction indicator 167 which, as shown in Fig. 1, is similar to the amount and clerk's indicators, but is more extended in width since it is necessary to accommodate more characters.

The illustrative machine shows merely one set of indicators whereby the amounts, clerk's initial, and a legend indicating the transaction recorded will be publicly indicated at the front of the machine, but if so desired a duplicate set of indicators may be provided so that the same information is readable at the opposite side of the machine. This merely requires in addition to a duplicate set of indicators similarly lettered some suitable connections between the two sets so that related indicators will be adjusted simultaneously. To this end any type of connection well known in the art may be utilized, such as that shown in the patent to J. P. Cleal and F. A. Reinhard, #580,378, patented Apr. 13, 1897, or, if so desired, the connecting devices shown in the patent to J. P. Cleal and A. Macauley, #920,110 dated May 4, 1909 may be utilized for this purpose.

Printing mechanism

The illustrative machine is provided with a simple and effective printing mechanism whereby the amounts entered in the machine will be printed upon the record medium, together with abbreviations representing the type of transaction entered as well as an initial representing the clerk's key operated. Provision is also made for the entry of written notations adjacent each printed item whereby the items may be further identified.

In order to adjust the type carriers differentially each rack plate 146 (Fig. 2) associated with the amount key differential mechanism meshes with a segment 168 attached to one of a series of parallel shafts 169 each shaft having rigidly secured to it toward one end a somewhat similar gear segment 170 (Fig. 6) which, as shown in Fig. 15, meshes with a related gear segment 172 loosely mounted upon the shaft 147 and provided at its upper end with a segmental portion 173 carrying type elements 174 for printthe digits "0 to 9", inclusive. The same sort of connection is provided between each rack plate 146 of an amount differential mechanism to a corresponding amount printing type segment 173 so that during the first half of the operation of the machine at which time the rack plate 146 is moved differentially, each of the segments 173 will be moved rearwardly a distance commensurate with the amount key depressed in its related bank and when a platen is operated an impression will be made on the record material denoting the amount entered in the machine.

As best shown in Fig. 5, the rack plate 146 associated with the differential mechanism for the clerk's bank of keys meshes with a segment 175 attached to a shaft 176. The shaft 176 is provided at its opposite end with a gear segment 177 (Fig. 6) meshing with teeth formed on the lower part of a segment member 178 (Fig. 4) provided at its upper end with printing type elements representing the clerk who has operated the machine.

In order to differentially adjust the transaction type carrier the rack plate 146 associated with the differential device for the transaction key bank meshes with a gear segment 179 (Fig. 13) attached to a shaft 180 which extends transversely of the machine as shown in Fig. 5, having attached at its extreme end a segment 181 (Fig. 6) meshing with the teeth of a segment 182 (Fig. 4) formed at its upper end with printing type elements representing the different transactions. As best shown in Fig. 4, the printing type segments 173, 178, and 182 are adjacent to each other and are normally positioned beneath a platen.

The platen comprises, as best shown in Figs. 4, 7, and 15, two forwardly extending arms 183 integral with which is a cross head 184 carrying at its forward end a rubber impression block 185 which extends transversely and above the various printing segments.

The record bearing material is taken from a supply roll 186, (Fig. 7) and is drawn forwardly under the rubber impression block 185 over a writing table 187, and then rearwardly under a curves glass 188, over a fixed roller 189 and finally onto a storage roll 190.

An inking ribbon 191 is interposed between the rubber impression block and the type printing elements and extends transversely across the type printing segments as best shown in Fig. 4. The inking ribbon, as shown, is of the endless belt ribbon type being carried by supporting rollers 192 at one end and being suitably guided around a felt roller 193 at the other end, this roller being moistened with printing ink.

Any suitable means may be provided for effecting a step-by-step movement of the inking ribbon so as to present a new portion of the ribbon to the type segments as desired. The feeding operation may be either performed by a manually operated lever projecting through the machine cabinet and having a feeding connection to one of the rollers as is well known to those skilled in the art, or, if so desired, a connection may be effected between the inking ribbon mechanism and one of the operating shafts so that during each operation of the machine the ribbon will be automatically fed an increment. The inking mechanism and means for feeding it form no part of the present invention and are therefore, not described in detail.

In order to move the platen frame and rubber impression block downwardly against the differentially adjusted type one of the arms 183 carries a screw member 194 connected to a member 195 which is bifurcated at its lower end to receive the shaft 53 and carries a roller 196 engaging the race of a box cam 197 secured to shaft 53. The configuration of the cam slot in the box cam is such that during each operation of the machine, after the type segments have been differentially adjusted, the impression block will be forced downwardly to effect an impression upon the record strip which is then fed an increment by devices which will now be described.

The storage roll carries at one end a ratchet wheel 198 engaged by a spring-pressed pawl 199 carried by a bell-crank 200 loosely mounted upon a shaft 201. As best shown in Fig. 13 the lower end of the bell-crank carries a roller engaging the race of a box cam 202, the configuration of the cam slot being such that after printing is effected the bell-crank 200 will be rocked counterclockwise as viewed in Fig. 7, so that the pawl 199 co-operating with the ratchet wheel 198 will feed the paper an increment so that after each printing impression the record material will be drawn around the platen and onto the writing table 187 placing the last printed entry in line with a slot 203 (Fig. 1) formed in the glass 188.

The slot 203 permits written notations to be entered in juxtaposition to each printed item as clearly illustrated in Fig. 1. The glass 188 is of such dimensions that a number of the entered items are visible, it being understod, of course, that the other previously printed items are wound upon the record receiving roller 190. The printing mechanism is entirely concealed by means of the cabinet cover 49 which is locked by means of a lock 205 to prevent fraudulent access to the various elements comprising the printing mechanism.

Multiple totalizers

The illustrative machine is provided with a plurality of totalizing devices for segregating the amounts of the different transactions entered in the machine. There is a totalizer appropriated to each of the "received on account", "charge" and "paid out" keys, a supplemental totalizer being provided for accumulating cash sales entered in the machine. Cash sales are entered by simply depressing the amount keys together with the desired clerk's key and then subsequently operating the crank handle, it being obvious, of course, that during such transactions no transaction key is operated. In addition to the above described totalizers, another totalizer is provided which is designated as the "grand" totalizer intended in the embodiment shown to accumulate all the items entered in the "charge" and "cash" totalizers representing the total amount of sales performed during some arbitrary period.

Since the construction of the various totalizers is alike a description of one will suffice for all. Each totalizer comprises a frame 210 (Fig. 16) journaled between the totalizer support frames 44 and 45 by means of journal pins 211. Each totalizer carries a totalizer wheel supporting shaft 212 said shaft carrying a plurality of totalizer pinions 213. There are a sufficient number of differential devices for the accumulating section of the machine for six denominational orders, and there are a corresponding number of totalizer pinions 213; in order to actuate them differentially each of the segments 172 is provided with a segmental rack 214 (Fig. 15). The journal pins 211 are the pivotal points of each of the totalizers and the totalizer frames are adapted to be rocked about these points as a center to bring the totalizer pinions 213 into mesh with the segmental racks 214, it being observed in Fig. 16, that the pinions 213 and racks 214 are in alignment with each other and that the racks 214, as shown in Fig. 15, are of sufficient dimensions to engage any of the pinions of a totalizer which may be selected for operation. As shown in Fig. 13, there is attached to each totalizer wheel supporting shaft 212 a downwardly extending arm 215, the lower end of which slides in a radial slot formed in the totalizer support frame 45 and each arm 215 is provided with a slot 216 substantially concentric with respect to the shaft 147.

The differential mechanism for the transaction key bank as already explained comprises the lever 139T and the complementally moved lever 145T similar to those described in connection with the amount key differential mechanism, it being noted, however, that the universal bar 137 (Fig. 6) is not of sufficient length to co-operate with the slot 138 of the lever 139 related to the transaction bank differential mechanism, and that a stud or rod 220 is provided for this purpose. The stud 220 is carried by an upwardly extending arm 221 (Figs. 6 and 9) integral with which is a rearwardly extending arm 222 provided at its rearward end with oppositely extending rollers 223 and 224 (see also Figs. 6 and 11).

In the normal item entering operations the roller 223 engages a slot formed in a box cam 225 mounted for rotary movement with the driving shaft 57 (see Figs. 6 and 12). It will be noted in Fig. 12 that the configuration of the cam slot in the cam 225 which is effective during item entering operations (the various portions being designated by the reference character 226) is different from the cam slot in the box cam 134 (Fig. 5) for operating the amount and clerk's key differential mechanisms and it is so designed that the pin 223 during the first movement of the driving shaft 57 will dwell a longer time than the rod 137. In normal "add" operations the levers 139 and 145 of the amount and clerk's key differential mechanism will move towards each other prior to any movement of the corresponding members 139 and 145 of the transaction differential mechanism and substantially at or just prior to the time that the levers 139 and 145 of the amount differentials close upon the opposite sides of a depressed key, a portion of the cam slot 226 will be effective to begin to rock the arm 222 so that as it continues it will rock the stud 220 (Fig. 13) downwardly thereby forcing the associated levers 139T and 145T to close upon each other. It will be understood that the levers 139 and 145 of the amount key differential devices will at this time have been properly positioned and remain in such position, it also being clear that the operating segments 214 are stationary at this time. This timing relation is necessary since it is desirable to first differentially adjust the actuating racks 214 and then while they are stationary, differentially move the levers 139T and 145T of the transaction differential mechanism so that the desired totalizer will be engaged with the positioned racks, the latter then being restored to their normal positions to effect adding in the totalizer while the pinions remain engaged with these actuators.

In order to select the cash totalizer for operation it is only necessary to depress the desired amount keys and a clerk's key to release the machine for operation final operation being performed by operating the crank handle as previously described. It will be noted in Fig. 13, that the differentially movable lever 139T is equipped with a pin 227 and that pivotally mounted by a pin 217 upon the lever 145T is a cam member 228 formed with a lug 229 and a cam slot 230. A coil spring 218 tends to rock the cam member 228 clockwise but it is stopped by the co-operation of its forward edge with an integral projection 219 of the lever 145T (see Fig. 14).

Fig. 13 shows the normal position of the parts which they are in prior to an operation for entering an item in the cash totalizer 231. Sometime after the operation of the machine by the crank handle has commenced, the stud 220 will be rocked about the shaft 136 and since no key in the transaction bank has been depressed the zero stop pawl will remain in its normal or effective position to prevent any movement of the lever 145ᵀ so that the lever 139ᵀ will be rocked downwardly until the pin 227 enters the cam slot 230 formed in the member 228. In the normal position of the parts the lug 229 is already in engagement with the slot 216 of the arm 215 related to the cash totalizer 231. As the pin 227 enters the slot 230 it will positively rock the member 228 counter-clockwise (Fig. 13) about its pivotal point 217 and by the co-operation of the lug 229 with the slot 216 will rock the cash totalizer about its pivotal point 211 to bring the totalizer pinions 213 into mesh with the actuating racks 214 which at this time have been positioned differentially and are now stationary. As the machine is further operated the racks 214 will then be restored differentially commensurate with the amount keys depressed in the related banks which will result in entering upon the cash totalizer the item represented by the depressed keys since the cam slot 226 (Fig. 12) will be effective at this time to retain the pinions in mesh with the racks 214. When the racks are in their normal positions the arm 222 (Fig. 13) will be rocked reversely resulting in moving the stud 220 counter-clockwise about its pivotal point 136 and the initial movement in this direction will, by the disengagement of the pin 227 from the cam slot 230, result in the pinions of the cash totalizer 231 being disengaged from the actuating racks 214, continued operation of the machine serving to restore the transaction levers 139ᵀ and 145ᵀ to normal.

As previously stated a "grand" totalizer 232 (Fig. 13) is provided and since amounts added in the cash totalizer represent a part of the total sales transacted during a certain period it is desirable to enter the same amount upon the "grand" totalizer. The totalizer wheel supporting shaft 212 of the "grand" totalizer 232 is also provided with a downwardly extending arm 215ᴳ which is not slotted at its lower end but is provided with a pin 233 engaging a slot 234 of a plate 235, the latter being slotted at 236 to engage the shaft 147. The segment plate 235 is urged to its normal or upper position by means of a coil spring 237 bearing against the shaft 147 and fitted into a socket formed in an integral extension 238 of the plate 235. The segment plate 235 is provided with a plurality of projections 240, 241 and 242, the projection 242 normally engaging a pin 243 attached to the camming member 228.

It will be obvious from the description just given that when the pin 227 passes in the slot 230 of the camming member 228 the latter will be rocked counter-clockwise to bring the cash totalizer into mesh with the operating racks and by the co-operation of the pin 243 with the extension 242 will rock the segment plate 235 downwardly, it being guided in its downward movement by the slot 236 engaging the shaft 147 and this downward movement of the plate 235 will, through the co-operation of the slot 234 and the pin 233 force the arm 215ᴳ related to the grand totalizer 232 downwardly thus bringing the totalizer pinions related to the last mentioned totalizer into mesh with the actuating racks so that the grand totalizer will simultaneously accumulate the same item entered in the cash totalizer 231.

It is desirable to provide some means whereby the totalizers may not accidentally fall into mesh with the actuating racks by virtue of their weight or be improperly forced into operative relationship with the racks. To this end suitable locking devices are provided to effectively prevent this. As shown in Figs. 13 and 14 the pin 217 which is carried by the lever 145ᵀ and which is the pivotal point of the camming member 228 extends laterally a sufficient extent to project into a supplemental segmental plate 244, loosely mounted upon the shaft 147 and the periphery of which is concentric with respect to the shaft 147. It will be obvious that by the connecting pin 217 the segment plate 244 will partake of the same movement as the lever 145ᵀ and the camming member 228. It will be clear also from Fig. 13 that the downward extensions of the arms 215 related to the "received on account" totalizer 245, the "charge" totalizer 246, and the "paid out" totalizer 247 normally rest upon the periphery of the segmental plate 244 thus preventing the totalizers from being rocked about their pivotal points. The pinions of the grand totalizer 232 are normally spring held against being rocked into co-operative relationship with the racks 214 by the co-operation of the pin 233 with the slot 234 of the spring-urged plate 235. The cash totalizer 231 is normally spring held in its normal position under the action of springs 218 and 237 by the co-operation of the pin 243 with the projection 242 of the segmental plate 235. It will be noted, however, that the segment plate 244 is provided with a notch 248 which is normally poistioned over the rear end of the arm 215 related to the cash totalizer 231 so that there will be no interference when this totalizer is drawn into mesh with the operating racks upon an operation of the machine. In order to lock and unlock the grand totalizer at the desired time there is attached to the segment plate 244 a supplemental segment plate 250 provided with notches 251, 252, and 253, the rearmost notch 251 being normally positioned under the lower end of the arm 215 related to the grand totalizer thereby permitting the grand totalizer to be normally drawn into mesh during a cash operation.

When it is desired to enter an amount in the machine which represents a "paid out" transaction the desired amount keys are depressed and in addition, the "paid out" key 66 is also depressed. the machine then being released by a clerk's key and finally operated by the operation of the crank handle. When the "paid out" key 66 is depressed the zero stop 80 will be disabled in a manner previously described. When the crank handle is operated the driving shaft 257 will rock the stud 220 forwardly (Fig. 13) about the pivotal point 136 which results in first rocking the lever 145ᵀ upwardly due to the retarding action of spring 141 connected to the lever 139ᵀ until the extreme forward end of the lever 145ᵀ co-operates with the stem of the "paid out" key 66 at which time the pin 243 of the camming member 228 is brought out of co-operative relationship with the projection 242 so that when the lever 145ᵀ strikes the stem of the "paid out" key the pin 243 will be positioned over a cut-away portion of the plate 235 between the projections 240 and 241. When the camming member 228 is moved upwardly by the lever 145ᵀ the lug 229 will be disengaged from the slot 216 of the arm 215 related to the cash totalizer 231 and will then engage the slot 216 formed in the arm 215 related to the "paid out" totalizer 247. Since the segment plate 244 moves simultaneously with the lever 145 the notch 248 therein will be positioned in rear of the rearward end of the arm 215 of the "paid out" totalizer so that when the lever 139 moves downwardly the pin 227 will enter the camming slot 230 with the result that the arm 215 will be drawn downwardly rocking the totalizer pinions of the "paid out" totalizer 247 into mesh with the segmental racks 214 which are then stationary. Since the lower end of the arm 215 of the "paid out" totalizer registers with the notch 248 there will be no interference between the arm 215 and the plate 244 when the totalizer is drawn into mesh with the actuating racks. The pin 243 will, however, be positioned over the cut-away portion of the plate 235 so that while the camming member 228 is rocked counter-clockwise it will not actuate the segmental plate 235 and the grand totalizer pinions will not be engaged with the actuating racks.

It will also be observed that while the notch 248 registers with the lower end of the arm 251 related to the "paid out" totalizer 247 the periphery of the segmental plate 244 on either side of the notch 248 will co-act with the lower ends of the arms of the totalizers 231, 245, and 246 so that their pinions may not be intentionally or accidentally forced into operative relationship with the actuating racks. It should also be observed that counterclockwise movement of the segmental plate 244 will also adjust the segmental plate 250 attached thereto so that its periphery instead of a notch co-operates with the lower edge of the arm 215G carried by the totalizer wheel supporting shaft 212 of the grand totalizer 232 thereby locking it in its normal position. It will be understood, of course, that the "paid out" totalizer is meshed with the differentially positioned actuating racks, the latter being then restored to normal while the totalizer remains in the engaged position so that the desired amount will be entered in the "paid out" totalizer after which the levers 139T and 145T will be moved away from each other so that the pin 227 engaging the forward edge of the cam slot 230 positively withdraws the pinions of the "paid out" totalizer from mesh with the actuating racks.

When it is desired to enter an amount in the "charge" totalizer, the "charge" key 65 is depressed which will result in the engagement of the lug 229 with the slot 216 of the arm 215 of the "charge" totalizer 246 so that this latter totalizer will be meshed with the actuating racks and operated differentially in a manner like that just described. It should also be observed that when the "charge" totalizer is selected for operation the pin 243 of the camming plate 228 will be positioned over the lug 248 of the segmental plate 238 so that the grand totalizer 232 will simultaneously receive the same amount entered in the "charge" totalizer 246.

"Received on account" transactions are entered in substantially the same manner, with the exception that the "received on account" key 63 will be depressed which will result in the engagement of the pinions of the "received on account" totalizer 245 with the actuating racks 214. Attention is also directed to the fact that when amounts are entered in the "received on account" totalizer 245 the item will not be entered in the grand totalizer 232 since the pin 243 is positioned over a portion of the normal periphery of the plate 235. It will be noted therefore that only in "charge", and "cash", the grand totalizer will accumulate all the items entered in the related totalizers thus giving a grand total of all the new sales transacted.

The above makes it clear that the entering of amounts on the "grand" totalizer simultaneously with any selected transaction totalizer is dependent upon whether or not a corresponding projection is formed on the controlling plate 235. The absence of such a projection will, therefore, result in the "grand" totalizer not being actuated while the presence of a projection will cause it to simultaneously accumulate the same items as the selected transaction totalizer. By the present construction a very flexible arrangement is provided to meet the various needs and exigencies of the different types of business in which machines of the class described are employed.

The arrangement shown and described permits the "grand" totalizer to indicate the total amount of "cash" and "charge" business transacted but if it is desired to have the "grand" totalizer register the total amount of the cash received it is only necessary to have projections formed on the plate 235 to correspond with the "received on account" and "cash" totalizers so that the absence of projections corresponding to the "paid out" and "charge" totalizer would cause the "grand" totalizer not to be actuated when entering "paid out" and "charge" transactions. When the machine is constructed in this manner the "grand" totalizer will indicate the total amount of cash received. By subtracting the amount standing on the "paid out" totalizer from that indicated on the "grand" totalizer, the amount of cash that should be in the cash drawer may readily be determined.

Located in the bank of transaction keys is a key 64 designated as the "No sale" key for controlling certain functions independent of an entry of a sale. No totalizer is provided for the "no sale" key and a depression of this key followed by a subsequent operation of the machine merely results in the indication and printing of a "no sale" designation. When the "no sale" key is depressed it will serve to stop the levers 139T and 145T at a position determined by the stem of the depressed key, the arrangement and location of the key being such that when the complementally moved members are on opposite sides of the key the pin 227 will be engaged with the cam slot 230 of the camming member 228, but the lug 229 of the camming member will not engage any of the slots of the arms 215 of any of the totalizers, and in addition, the pin 243 of the camming member will register with the cut-away portion of the plate 235 intermediate a pair of projections. Therefore, no totalizer will be engaged with the actuating racks when a "no sale" key is depressed, the differential mechanism being utilized only to impart a movement to the shaft 180 to adjust the type carrier to the "no sale" position, and at the same time differentially adjust the link 166 (Fig. 9) so as to set the transaction indicator to the proper indicating position.

*Transfer mechanism*

The transfer mechanism employed in the machine shown is of the independently actuated type in which the various orders are successively operated at a time when the totalizer pinions are out of mesh with their respective actuators 214. The transfer mechanism is best shown in Figs. 15 to 19, inclusive. Since the transfer devices between each denominational order and the next higher for each totalizer are identical a description of one will suffice for all. Each totalizer pinion 213 (Figs. 15 and 17) has rigidly secured to it at one side a transfer disk 255 provided with a tripping projection 256 which is positioned to cooperate on occasion with the trip tooth 257 and is adapted to engage therewith as the totalizer element passes from its "9" to its "0" position. The trip tooth 257 is formed as an extension of an arm 258 loosely mounted upon a shaft 259 carried by the totalizer frame 210, the rear end of said arm being further provided with a shelf 260. Loosely pivoted upon the shaft 259 adjacent the arm 258 is a transfer arm 261 which has pivoted at its forward end a transfer pawl 262 provided with a bent over lug 263. The transfer arm 261 is provided with a stud 264 and a notch 265, the latter receiving the lug 263, it being noted that the upper engaging end of the transfer pawl 262 carried by the arm 261 engages a ratchet wheel 266 attached to the totalizer element of the next higher order and normally lies in close proximity to said ratchet wheel. A spring 267 is coiled around the stud 264, one end engaging a pin carried by the arm 258 and the other the lug 263 thus forcing the lug 263 of the pawl 262 against the shelf 260 as best shown in Fig. 17.

Each time that the transfer disk 255 makes a complete revolution the tripping projection 256 contacting with the trip tooth 257 will force the arm 258 downwardly against the tension in the spring 267. The result of this movement is that the vertical edge of the shelf 260 will ride along the lug 263 until said lug clears the shelf whereupon the spring 267 will force the pawl 262 downwardly sufficiently to bring the upper engaging end of the pawl in contact with one of the teeth of the ratchet wheel 266 of next higher order. Subsequently after the totalizer wheels are disengaged from the actuators, the transfer arm will be given a movement so that the pawl 262 engaging the ratchet wheel will impart a movement of one unit to the wheel of the next higher order.

The transfer operating arms 261 extend rearwardly each being provided with a stud 268 engaging its related notch 269 (Fig. 15) formed in a transfer segmental plate 270 which is loosely pivoted upon the shaft 147 and is provided with a rearward extension 271, said extension being urged downwardly by means of a spring 272 so that a roller 273 carried at its extreme rearward end engages the periphery of a disk 274 securely attached to the shaft 57. The disk 274 is provided with a projection 275. As best shown in Fig. 15 there is provided a plurality of transfer segmental plates 270, one for each denominational order, and they all are provided with rearward extensions 271 adapted to be operated by the projections 275 of their associated operating cam disks 274. As will be noted the projections 275 have a different angular relation with a line passing through the shaft 57 and the roller 273 so that the arms 271 will be operated seriatim thus actuating the segmental plates successively, first the tens transfer plate, then the hundreds, etc. Attention is directed to the fact that transfers are effected during the final operation of the machine at which time the totalizer pinions are out of mesh with the actuating racks 214 so that at the end of each operation of the machine the totalizers will represent the total amounts entered in the machine up to that time. The construction is such, furthermore, that the rocking of the arm 241 to effect carrying serves to restore the lug 263 to its normal position on the shelf 260 due to the camming or lifting effect of the teeth of ratchet 266 on the end of the pawl 262.

*Total taking mechanism*

As previously stated the illustrative machine is provided with a total lever 61 which is normally (Fig. 1) in a position designated as "Add" in which position the machine is conditioned for accumulating the items entered in one or more of the various totalizers. The control lever 61 may be moved to two other positions designated as "Read" and "Reset" which, in the first instance, conditions the machine so that the amount standing upon any of the totalizers may be obtained by printing the total upon the record strip. Movement of the total lever to the "reset" position permits the printing of the amounts standing upon the various totalizers while at the same time the selected totalizers may be reset to zero in successive operations of the machine. It should also be observed that in total taking and resetting operations, the machine is operated by the crank handle as is the case with item entering operations.

The shank of the total lever 61, as best shown in Fig. 9, is in the form of a square rod 280 connected to a bifurcated member 281, the latter being pivoted to the fixed frame of the machine by a stud 282, it being noted that the upper end of the total lever projects through the machine cabinet and is movable in a slot in the cabinet so that it may be placed adjacent the various legends "Add", "Read" and "Reset". The upper end of the square rod 280 just beneath the machine cabinet is provided with a segmental portion 283 (Fig. 4) below part of which is an integral camming portion 284. Since in total taking operations of the machine the clerks' keys are ordinarily not depressed additional mechanism is provided whereby the total lever 61 will release the machine for one operation when it is moved out of the "add" position while for subsequent totaling operations the various transaction keys will release the machine, and mechanism for accomplishing this function will now be described in detail.

Rigidly secured to the shaft 118 (Figs. 4 and 9) are a plurality of forwardly extending arms 285 carrying a transverse rod 286. The arm 285 on the extreme right is provided with a rearward extension 287 adapted to be engaged by the camming portion 284 of the total lever so that when the total lever is moved out of the "add" position the rod 286 will be moved downwardly. As will be seen in Fig. 10, the releasing arm 90 is provided with an upward projection 288 normally underlying the rod 286 so that when the rod 286 is moved downwardly its coaction with the extension 288 will rock the arm 90 downwardly and release the machine for operation in exactly the same manner as the clerks' keys do as has been explained hereinbefore.

As was explained in connection with the operation of the releasing mechanism, when a clerk's key is depressed and the machine operated the arm 90 is given a movement sufficient to cause the shoulder 96 to completely escape the shoulder on the pivoted element 97 mounted on the locking arm 93. This permits the latter to be rocked by spring 95 to again present the locking shoulder 92 in the path of the co-operating notch in disk 91. During item entering operations the arm 90 would subsequently be rocked upwardly, and in its upward movement would merely idly rock the element 97 about its pivot, to restore the parts to their normal position shown in Fig. 10. During totaling operations, however, the rod 286 will remain in its lowered position so long as the control lever 61 is out of the "add" position. Therefore, as the bail 115 rises the arm 90 can only follow until the shoulder 288 strikes the rod 286.

This will not be sufficient to place the shoulder 96 in its normal position over the shoulder on element 97 and the machine will therefore remain locked.

In order to avoid the necessity of shifting the control lever back to the "add" position and then again to the "read" or "reset" position for each subsequent totaling operation from the series of transaction totalizers as well as the grand totalizer, another train of releasing mechanism is provided and is placed directly under the control of the transaction bank of keys. As best shown in Figs. 4 and 21, this secondary releasing mechanism comprises an arm 901 adjacent the arm 90 and provided with a shoulder 961 similar to shoulder 96 and adapted to co-operate with the same pivoted element 97 on the locking arm 93. The arm 901, however, is cut away so as not to be in the path of movement of bail 115 and it is out of the plane of pin 89, which is operated by the depression of a clerk's key. The arm 1263, associated with the transaction bank of keys is connected by means of a cross bail 1262 to a corresponding arm 1261 which, as shown in Fig. 4, is just to the left of the releasing arm 901. The arm 1261, furthermore, carries a pin 891, which extends into the plane of a pivoted member 902 carried by the secondary releasing arm 901. A spring 903, attached at one end to an arm of member 902 and at its other end to the pin 891, serves to hold these parts in the normal relationship shown in Fig. 21. It will be recalled that upon the operation of a transaction key the arm 1263 will be rocked downwardly and since this is connected by cross bail 1262 to the arm 1261, the latter will also be rocked downwardly. The pin 891 will at this time rock the pivoted member 902 idly about its pivot without affecting the arm 901 which is held in its normal elevated position by means of spring 981.

During adding operations, therefore, depression of a transaction key will have no effect upon the locking arm 93 and it will merely serve to rock the member 902 idly upon its pivot. When the control lever 61 is moved out of the "add" position, however, to either the "read" or "reset" position, the rod 286 will be lowered until it is substantially in contact with the surface 904 of the member 902. Now, upon a subsequent depression of a transaction key, the member 902 cannot rock idly about its pivot and, as a result, when the pin 891 is lowered the secondary releasing arm 901 will be correspondingly moved, so that by engagement of its shoulder 961 with the element 97, the locking arm 93 will be rocked to releasing position. During the operation of the machine which follows, the bail 115, through its movement of arm 88, will rock the arm 90, and through its movement of the arms 1263 and 1261, will rock the arm 901 still further. As the bail 115 rises again the arm 90 will follow only until the shoulder 288 is stopped by the rod 286, but the arm 901 will follow until it reaches its normal position in which the shoulder 961 is again above the shoulder on element 97.

As a result of the construction just described, it will be apparent that it is possible to take a single total, say that of the "cash" totalizer, immediately upon the movement of the control lever out of the "add" position, while for subsequent totaling operations the depression of any one of the keys in the transaction key bank will serve to release the machine. It is not possible, however, to release the machine by means of a transaction key during item entering operations.

In order to prevent any operation of the amount or clerk's key during total taking and resetting operations of the machine, the shaft 76 has rigidly secured to it a rearwardly extending arm 291 (Figs. 4 and 9) which is notched to receive the rod 286. As shown in Fig. 10 rigidly attached to the shaft 76 are a series of forwardly extending arms 292 which are in the planes of the various key stops 99 and directly in rear of the uppermost key stops. If no keys in any of the banks have been depressed, it will be obvious that when the rod 286 is moved downwardly by movement of the control lever out of the "add" position the shaft 76 will be rocked counter-clockwise bringing the arm 292 back of the rearmost key stops 99 of the amount and clerk's key banks locking all of the key stops against depression and thereby preventing a depression of any of the keys as long as the control lever is out of the adding position.

The mechanism just described operates conversely as well, that is, if an amount key or clerk's key should have previously been depressed while the total lever is in the "add" position it will not be possible to move the total lever out of the adding position since the rearmost stops of the clerk's and amount key banks are each provided with a notched portion 293 (Fig. 10) which, when any of the keys in a bank is depressed, will engage the arm 292 thereby locking the shaft 76 against movement and through the rod 286 preventing movement of the total lever out of the adding position.

It is obvious from the above described construction that if the control lever should be in the "add" position and one of the amount keys should have previously been depressed it will not be possible to move the lever out of this position thus requiring the manipulation of the error key to release the incorrectly depressed amount keys.

Fig. 20 of the drawings illustrates a modification of the mechanism which may be employed to automatically release any previously depressed amount keys and to lock the keys of the clerk's and amount banks upon movement of the control lever out of the "add" position. As will be noted the arms 126 (Fig. 2), movable with the detents of the amount key banks extend far enough rearwardly so as to underlie the rod 286 and it will be obvious, if an amount key has previously been depressed its notch 70 will be engaged by the lug 71 of the detent 72. As will be noted also in Fig. 20, the arm 291 is not directly pinned to the shaft 76 as in the previously described construction, but the connection between the arm and shaft comprises a torsion spring 761, one end of which is connected to the arm 291 and the other fast to the shaft 76.

Assuming, therefore, that an amount key has been depressed and the total control lever is in the "add" position, it will be noted that depression of one of the keys will bring the notched portion 293 (Fig. 10) of the rearmost key stop of that bank in engagement with one of the arms 292 fast to the shaft 76 thus holding the shaft 76 rigid. When the control lever is moved out of the "add" position the rod 286 will be moved downwardly this resulting in rocking the arm 291 counter-clockwise (Fig. 9) and since the shaft 76 is held against rotation the spring 761 will be tensioned, the energy in the spring tending to rock the shaft 76 counter-clockwise, as viewed in Fig. 10. At a certain point in the movement of the control lever out of the "add" position, the rod 286 will engage the arms 126 moving the amount key detents downwardly thus disengaging the notch 70 of the depressed key from the lug 71 of the detent and permitting the spring 68 to return the key to its normal position.

When a depressed key is returned to its normal position the key stops will be unlocked so that the energy in the spring 761 will be effective to rock the shaft 76 and raise the arms 292 (Fig. 10) of the amount and clerk's banks upwardly bringing them in front of the rearmost key stops, thereby locking the related keys against movement. Summarizing, the modified construction therefore, movement of the control lever out of the "add" position will automatically release the amount keys which have been incorrectly depressed and subsequently lock the keys of the amount and clerk's bank against operation.

Any suitable means may be utilized to retain the total lever in its adjusted position so that when the lever is out of the adding position the rod 286 will be retained in its lowered position, and since this will hold all the amount key detents 72 downwardly it will, through the extension 78 hold the zero stop pawls 80 so that the shoulders 148 are out of co-operative relationship with the associated complementally moved members 145. As will be noted in Fig. 4 the arms 126 connected to the detents 72 of the four amount key banks all underlie the rod 286 so that all the zero stops of these banks will be disabled. As has been stated hereinbefore no keys are provided for the two highest denominational orders of the totalizer, but a zero stop pawl 80 of the usual form is provided for each of these orders and is operated by a detent plate 289 (Fig. 3) somewhat similar to the detents associated with the banks of keys, with the exception that in this case the lugs 71 are omitted. The arm 290 which is connected to the upper end of the detent 289 is similar to the arms 126 of the other amount key banks and is also of sufficient dimensions to underlie the rod 286.

Since the arm 88 (Fig. 5) associated with the clerk's key bank does not extend sufficiently to engage the rod 286 the zero stop pawl of the clerk's key bank will not be disabled by movement of the total lever out of the "add" position. As will be observed in Fig. 4, the arm 1263 connected to the detent of the transaction key bank is not in the path of movement of the rod 286 so in this case also the zero stop pawl 80 for the transaction bank of keys will not be disabled when the total lever is moved out of the adding position.

While as shown in Fig. 9, the key stop 109 and its projection 108 normally prevents depression of the grand total printing key, the latter key is not locked when the total lever is moved out of the adding position since it is employed in total taking operations to select the grand totalizer. However, as is best shown in this figure, when the shaft 76 is rocked counter-clockwise by movement of the lever out of the adding position the locking detent 109 will be moved downwardly taking the shoulder 108 of engagement with the pin 107 carried by the grand total key 62, thereby releasing this key for operation. Simultaneously an extension 294 integral with the detent 109 will be moved into locking relationship with a stud 295 carried by the "no sale" key 64 locking this against operation since it is not employed in total taking and resetting operations.

To prevent the disarrangement of the mechanism which might be possible if the control lever were moved out of any of its adjusted positions after a partial movement of the operating mechanism has commenced the following safety device is provided. As shown in Fig. 6 the cam 225 is integral with a sleeve 296 which has a splined connection 297 (Fig. 11) with the shaft 57 so that by this means the cam 225 may be shifted laterally and still be in rotative engagement with the shaft 57. To shift the cam 225 laterally to perform different functions which will be described hereinafter, the bifurcated member 281 (Fig. 9) which is connected to the total lever 280 carries a pair of pins 299 which are received by a groove 298 (Fig. 6) in the sleeve 296. Since the total lever 61 is pivoted at 282 movement of the total lever, will, through the connection just described shift the sleeve and cam to any position desired.

In order to effectively lock the total lever after a partial operation of the machine the sleeve 296 is milled so as to form annular rings 300 and grooves or slots 301, one for each position of the lever 61. As best shown in Fig. 11, the arm 222 has an integral segment shaped portion the latter having a beveled edge 302 adapted to be received by any of the slots 301 and when it is in alignment with a particular slot the total lever is in a properly adjusted position. As it will be noted in Fig. 12 the periphery of each annular ring 300 is cut away, the cut 303 being substantially concentric with respect to the shaft 136. When the spool 296 is so adjusted that the beveled edge 302 is in co-operation with one of the slots 301 and the shaft 57 partially rotated, it will be obvious that the sides of the adjacent annular rings 300 will engage the beveled edge 302 and since the arm 222 is held against lateral movement on the shaft 136 by means of a collar secured to the shaft (Fig. 6) and by a portion of frame 41, movement of the spool 296 and parts carried thereby cannot be effected by an attempted adjustment of the total control lever. The beveled edge 302, it will be noted, is of sufficient length to maintain engagement in a slot 301 throughout the rocking movement of the arm 222.

If the total lever should have been improperly adjusted the cut 303 of one of the rings 300 will be directly in line with the beveled edge 302 thereby acting as a Geneva lock against the rotation of the sleeve 296 and shaft 57. This prevents any movement of the crank or shaft 47 as long as the total lever is not set properly even though the usual machine lock is released by the total lever or a clerk's key.

In taking totals the printing segments are adjusted to the same extents as the totalizer actuators which are at this time engaged with the totalizer pinions and, therefore, are moved to extents required to restore these pinions to zero.

As may be observed in Fig. 15, the totalizer elements are rotated in a clockwise direction in adding operations, however, during totaling operations they are reversely rotated so that the totalizer elements may control movement of the actuators 214 and type carriers 173 a corresponding amount to that entered in the totalizer. The movement imparted to each rack 214 is governed by the engagement of the tripping projection 256 of the respective totalizer element with the trip tooth 257 of the transfer arms 258 when the totalizer elements have reached their zero position. Since no transfer device is employed for the totalizer element of the highest order this totalizer element (Fig. 18) has rigidly secured thereto the usual form of transfer disk 225 with a tripping projection 256 which co-operates with a spring-urged arm 304 having a projection 305 adapted to co-operate with the tripping projection 256 in a manner similar to that just described.

It is essential, of course, that in order that the totalizer elements control the movement of the actuators and printing segments, that the pinions of the selected totalizer be meshed with the actuators before the latter have begun their movement. This is effected by movement of the control lever to the "read" position which will shift the sleeve 296 laterally along the shaft 57 so that while the pin 223 is still in engagement with the slot in the cam 225 (Fig. 12) the adjacent pin 224 will now co-operate with a cam slot formed in a companion cam 307 (Fig. 11) which is integral with the sleeve 296 and also rotatable with the shaft 57. It will be noted that in this case movement of the arm 222 and the stud 220 will be controlled by both of the box cams 225 and 307.

It will be recalled that the spring 141 (Fig. 2) is connected to the lever 139 and is utilized for the purpose of holding the arm 139 against movement until the lever 145 and the rack plate 146 have been given the full movement, it being understood that the tension in the spring 141 is sufficient to hold the lever 139 so that its forward end is in constant engagement with the shoulder 140 of the frame until the lever 145 has been stopped by the engagement of the stem of the depressed key in adding operations, or as will now be described by engagement of the tripping projection 256 with the trip tooth 257 or 305 in totaling operations.

Adjustment of the control lever to the "read" position will unlock the machine for operation as explained before so that the total from the "cash" totalizer may be obtained. As the crank is operated the shaft 57 will be rotated in the direction of the arrow shown in Fig. 11, the pin 224 describing a path defined by the eccentric portion of the slot 308 formed in the cam 307. It will be noted in the beginning of the operation of the machine that the arm 222 will be almost immediately rocked clockwise resulting in carrying the stud 220 forward (Fig. 13). Since the arm 145ᵀ will be held by the zero stop 80 the lever 139ᵀ will be rocked downwardly at once until the pin 227 will engage the cam member 228 and rock it counter-clockwise so that during the first partial operation of the machine the pinions of the "cash" totalizer 231 will be meshed with the actuating racks 214 (Fig. 15) which are, at this time, stationary. After the pinions are meshed with the actuating racks the pin 224 will be located in the concentric portion 309 of the cam slot formed in the box cam 307, and as it will be observed in Fig. 12, the box cam 225 is also provided with an eccentric portion 310 and a concentric portion 311, corresponding to the cam portions 308 and 309 of the companion cam 307.

In the foregoing, reference has been made to the fact that movement of the total lever out of the "add" position will disable all the zero stops 80 of the amount differential devices this not only applying to the denominational orders for which keys are provided but the two highest orders as well. In this manner the total lever unlocks all the actuators 214.

As the pins 224 and 223 enter the substantially concentric portions 309 and 311 of the cams 307 and 225 respectively, the cams 134 (Figs. 2 and 6) will be effective to rock the universal rod 137 forwardly but since the spring 141 is sufficient to hold the forward end of the lever 139 against the abutment 140 continued movement of the universal rod 137 about the pivotal point 138 will result in a clockwise rotation of the lever 145 (Fig. 2), the rack plate 146, the connected actuating racks 214 and type segments 173, and since the totalizer pinions are at this time in engagement with the racks the latter will be moved differentially until the tripping projection of each totalizer element engages its related trip tooth at which time the corresponding lever 145 will be positively stopped just as if it had struck the stem of a depressed key. Continued movement of the universal rod 137 will then rock the lever 139 until it approximately strikes its associated lever 145. At this time the printing segments will have been adjusted to positions determined by the totalizer pinions and the platen will then be operated to effect a printing impression upon the record strip to exhibit on the record strip the amount which has been standing upon the totalizer.

Since in a total "reading" operation it is desired to retain the amount subtracted from the totalizer elements upon the totalizer, the actuators and printing segments are rotated reversely an equal amount while the pinions are still in mesh with the actuating racks 214, it being understood that the length of the concentric portions 309, 313, and 311, 226 are sufficient for this purpose and in the case of the cam 225 the pin 223 will pass into a portion of the cam slot 226 utilized for adding operations as already explained.

Attention is called to the fact that the slot 309 opens up into an eccentric cam slot 312. The cam slots 309 and 312 are of a greater depth than the cam slot 313 but in reading operations the pin 224 is moved into the cam slot 309 only a depth equal to that of the cam slot 313. It should be stated that the cam 225 is similarly constructed, that is, the adding controlling cam groove 226 is of greater depth than the portions 310 and 311 which are effective only during "read" totaling operations. By a comparison of Figures 11 and 12 it will be noted that the break between the concentric portions 309 and 313 of cam 307 required for the opening to channel 312 falls at a slightly different point from the similar break between portions 311 and 226 of cam 225 so that one or the other of the pins 223 and 224 will at all times be riding in an unbroken raceway during "read" total operations.

After the racks 214 are returned to their normal positions an eccentric slot 314, which is a continuation of the cam slot 313, will be effective to rock the arm 222 so that the stud 220 will separate the transaction differential levers 139ᵀ and 145ᵀ thus positively withdrawing the totalizer pinions from mesh with the actuating racks.

It will also be noted that when the total lever is moved to the "read" position and the shaft 76 (Fig. 13) is rocked counter-clockwise, as previously described, a downwardly extending arm 315 attached to the shaft and having a pin and slot connection 316 to an upward extension of the plate 235 will also be rocked. When the total lever is moved to either the "read" or "reset" position it will rock the plate 235 clockwise so that the projection 242 will be disengaged from the pin 243, but will be positioned at a cut-away portion 317 of the plate 235 between the projections 241 and 242 so that when the "cash" totalizer is rocked into and out of engagement with the racks during totaling operations, rocking of the member 228 will not cause movement of the plate 235 and therefore will not permit an engagement of the "grand" totalizer 232 with the actuating racks when it is desired to obtain the totals from the "cash" totalizer.

When it is desired to obtain the totals standing on the "grand" totalizer, it is necessary to retain the control lever in the "read" position and then depress the "grand" total key which will result in releasing the machine by the connections shown in Fig. 21 and in disabling of the zero stop pawl 80 (Fig. 13) of the transaction bank thus releasing the transaction lever 145$^T$ for movement so that the lever 145$^T$ will strike the stem of the depressed "grand" totalizer key which will permit the pin 243 to co-operate with the projection 241 and will carry the camming member 228 upwardly sufficiently to disengage the lug 229 from the slot 216 of the link 215 related to the "cash" totalizer. Therefore, when the pin 227 engages the cam slot 230 of the camming member it will rock the plate 235 downwardly and by means of the slot 234 engaging the pin 233 will draw the arm 215$^G$ of the "grand" totalizer downwardly and immediately engage the "grand" totalizer pinions with the actuating racks 214. It will also be noted that at this time the lower end of the arm 215$^G$ registers with the notch 252 of the plate 250. The rest of the operation is similar to that described in connection with the "cash" totalizer totaling operations, and will, therefore, not be repeated.

Printing of the totals standing upon the "paid out", "charge" and "received on account" totalizers is effected by merely depressing the desired key and operating the crank handle so that in each instance the lever 145$^T$ will have been moved differentially until the lug 229 will have engaged the slot 216 of the corresponding arm 215 and so that the pinions of the desired totalizer would be engaged with the actuating racks which are then reciprocated to adjust the type carriers differentially and to subsequently re-enter the amount subtracted from the totalizer elements. In obtaining the totals from the "paid out", "charge" and "received on account" totalizers, it will be noted that in each case the pin 243 will locate over a cut-away portion of the plate 235 so that the "grand" totalizer will not be simultaneously meshed with any of the other totalizers during total operations.

The operation whereby the totals are printed from the different totalizers and the totalizer elements are permitted to remain at zero is somewhat similar to that previously described, but to accomplish this the total lever is moved to the extreme right position, or that designated as the "reset" position. This will regulate the action of the totalizer engaging mechanism so that the selected totalizer will be disengaged from the actuating racks when the racks are in their upward or differentially moved positions, thus leaving the selected totalizer at its zero position. Also in the same instance, the total amount added to the totalizer is printed on the detail strip.

When the control lever is moved to the "reset" position the pin 223 is entirely disengaged from co-operation with the cam 225 but the pin 224 will be moved deeper into the slot 308 of the cam 307 so that in resetting operations also the totalizer pinions will be immediately drawn into engagement with the actuators which are then moved upwardly differentially as controlled by the totalizer pinions, but at substantially the time the amount levers 139 and 145 are adjacent to each other, at which time the racks 214 will have been given their maximum upward movement, the stud 224 (Fig. 11) will be at the junction of the slots 312 and 313. As previously stated the slot 312 is deeper than the slot 313 so that the pin 224 striking the wall 318 will not be able to pass into the slot 313 but will necessarily pass into the slot 312 which, as noted, is eccentric to the shaft 57 so that the arms 139$^T$ and 145$^T$ of the transaction bank will be separated and the zeroized totalizer elements will be withdrawn from the actuating racks. With the exception of the difference in timing just mentioned, the resetting operations whereby the amounts may be read from any of the selected totalizers and the latter are incidentally reset are similar to those described in connection with the printing of "read" totals. When the lever is shifted to the "reset" position the machine is conditioned for resetting the "cash" totalizer 231 and resetting of the other totalizers may be performed by the depression of the related key which will release the machine for such operations, and as long as the total lever remains in the "reset" position, the totals may be printed upon the record strip and the elements will be left in their zero positions.

In order to prevent unauthorized persons from moving the control lever out of the adding position the segmental portion 283 (Figs. 4 and 9) of the control lever is provided with an integral lug 320 which normally is adapted to co-operate with the shoulder 321 of a disk fast to the barrel of a lock 322 which, as shown in Fig. 1 projects through the machine cabinet. The lock 322 is adapted to retain the control lever in the adding position. The key of the lock 322 is usually retained by the proprietor or some other person of authority so that when the lock is operated the control lever may be moved to the "read" position, at which time the lever will be stopped by the co-action of the lug 320 with a shoulder 323 of a disk carried by a second lock 324. In some classes of business it is desirable that some other person should have control of the resetting of the various totalizers, and it is for this reason that the lock 324 is provided. When the lock 324 is operated, the control lever may, of course, be moved to its extreme position permitting the resetting of the totalizers as previously described.

When it is desired that one person have entire cotrol over the reading and resetting of the totalizers the lock 322 only is provided which normally retains the control lever in the adding position.

*General summary of operation*

The nature of the improved mechanism is such that in order to make the foregoing description as clear as possible, it has been necessary to state the operation considerably in detail as an incident to explaining the various features of construction. A complete re-statement here of the operation is therefore believed to be unnecessary. However, a resumé of the general operation of the machine will now be given to co-ordinate the operation and functions of the various parts which have been described in detail.

It will be assumed, for example, that clerk "A" desires to enter a "cash" transaction amounting to $8.25. It will also be assumed that the total control lever 61 is in its normal or "add" position and that the printing mechanism is equipped with an inking ribbon and a record strip and that the machine has previously been conditioned for accumulating items pertaining to the present period of business. The clerk will first depress the amount keys 58 in the various banks and it will be noted that as the amount key in each bank is operated the inclined edge 69 (Fig. 2) will, by its engagement with the lug 71 of the associated detent rock the latter downwardly against the tension of the connected spring 77 until the lug 71 will have been positioned over the notch 70 permitting the spring 77 to draw the detent upwardly a slight amount until the lug 71 will have been caught by the notch 70. In this manner the amount keys will be held depressed and as the detent of each bank is operated the extension 78 will, by engagement with the pin 79 disengage the zero stop pawl 80 from the shoulder of the lever 145 of the associated differential mechanism.

In the event that one of the amount keys should have been depressed in error the operator will depress the release key 132 (Fig. 2) and by rocking the shaft 131 the engagement of the rod 129 with the extensions 128 of the operated detents 72 will rock all the detents 72 downwardly enough to disengage the lugs 71 from the notches 78 of the depressed keys whereby the springs 68 of each of the depressed keys are effective to return them to their normal positions.

If the correct amount keys have been depressed the operator will then depress his associated clerk's key 59 which will be latched in its depressed position in a manner similar to that just described. When the clerk's key 59 is depressed the arm 88 (Fig. 5) will be rocked downwardly and by the engagement of the pin 89 with the arm 90 (Fig. 10) it will rock the latter downwardly and since the shoulder 96 (Fig. 10) of the arm 90 co-operates with the spring-pressed pawl 97 it will rock the bell-crank 93 clockwise and disengage the lug 92 from the shoulder of the disk 91, whereupon the spring 94 will be effective to move the lug 92 upwardly so that it will rest upon the periphery of the disk 91 and retain the machine in an unlocked condition.

It will also be noted that since the clerk's key moves the detent 84 (Fig. 5) downwardly, it will bring the concentric edge 134 of the supporting arm 85 in front of the rod 129, locking the shaft 131 against movement and preventing manipulation of the error key; thus it will be impossible to release any of the amount keys after the machine has been released for operation.

Further operation of the machine comprises the operation of the crank handle which is given two turns to perform the various functions which will now be described, attention also being directed at this time to the fact that since the transaction is assumed to be a "cash" transaction, none of the transaction keys need be depressed.

As the crank handle 50 (Fig. 8) is rotated its connected gear 51 will, through the gear 52 drive the shaft 53 and by means of the intermediate gear 54 and the gear 56 it will also drive the shaft 57. When a partial operation of the shaft 53 begins the arms 116 and 117 (Fig. 4) will be rocked downwardly by means of their associated cams 119 (Figs. 2 and 9) so that the bail member 115 will be rocked upwardly until it will engage either one or the other of the adjacent notches 113 and 114 (Fig. 2) of the amount key detents, depending upon whether or not a key has been depressed in that particular bank. In a similar manner the bail 115 will also engage either of the adjacent notches 123 (Fig. 5) of the clerk's key detent and likewise the bail will engage one of the adjacent notches 125 of the extension 124 (Fig. 10) of the detent 104 of the transaction key bank, it being clear therefore that all the keys of the different banks are locked against depression whether the keys in those banks have or have not been depressed.

As the shaft 57 partakes of its counter-clockwise rotation (as viewed in Fig. 2) the cams 134 after an initial idle movement will be effective to rock the universal rod 137 forwardly about the pivotal point 136 to differentially adjust the levers 139 and 145. Since the springs 141 have sufficient tension to temporarily hold the levers 139 so that their forward ends engage the abutments 140 of the frames, and since the shoulders 148 of the zero stop pawls 80 are released from the levers 145 of the differential devices of the banks in which the keys have been depressed the forward movement of the universal rod 137 will, through the pivotal connections 142 of the levers 139 with the segment plates 146, rock the latter clockwise (as viewed in Fig. 2) until the forward ends of the levers strike the stems of the "8" key in the dollars bank, the "2" key in the dimes bank and the "5" key in the cents bank and after this has been performed the companion levers 139 of the different banks will be rocked downwardly so that their forward ends strike the opposite sides of the stems of the depressed keys. The result of this construction is that each rack 146 will, through its associated segment 168, shaft 169, and segment 170 (Figs. 2, 7, and 15) differentially adjust its related segmental rack 214 and simultaneously bring to the printing line a character 174 corresponding to the key depressed.

Similarly, referring to Fig. 5, it will be noted that as the universal rod 137 commences its forward movement it will rock the lever 145 of the clerk's differential device upwardly since the shoulder 148 of the clerk's zero stop pawl 87 has been disengaged from the forward end of the lever 145, and since the uppermost key in the bank has been depressed, namely, the "A" key, the lever 145 will be given its maximum movement until it strikes the lower side of the stem of this key so that the segment plate 146 meshing with the segment 175 will rock the shaft 176 and as best shown in Fig. 6, the segment 177 at the right end of this shaft will adjust the clerk's printing segment 178 to bring the letter "A" under the platen.

At a certain point in the operation of the machine the cam 225 (Fig. 12) by the co-action of the pin 223 with the cam slot 226 of the cam will rock the arm 222 (Fig. 11) clockwise so that the stud 220 (Fig. 13) will rock the lever 139$^T$ of the transaction differential downwardly until the pin 227 engages the cam slot 230 of the camming member 228 and rocks the latter so that the lug 229 engaging the slot 216 of the arm 215 of the "cash" totalizer will draw the pinions 213 (Fig. 15) of the latter into engagement with the actuating racks 214 which are at this time differentially positioned and are stationary.

Attention is also called to the fact that since the pin 243 (Fig. 13) normally co-acts with the projection 242 of the plate 235 the latter will be forced downwardly and rearwardly so that the pin 233 co-operating with the cam slot 234 will carry the arm 215$^G$ of the "grand" totalizer downwardly thereby bringing the associated pinions into mesh with the actuating racks 214 to receive the same amount upon the "grand" totalizer as will be entered upon the "cash" totalizer.

At this time it should be noted that the levers 145 of the various differential mechanisms by co-operation with the studs 152 will adjust the links 75

151 and 163 (Figs. 2, 5, and 6) so that their related indicators 164 and 157 (Fig. 1) respectively, will indicate the amounts entered in the machine together with an initial representing the clerk's key depressed. As the various indicators are adjusted differentially the pins carried by the pawl arms 160 (Fig. 5) will ratchet over the teeth 159 of the segments 155, the springs 161 being effective to retain the indicators in their differentially adjusted positions.

The link 166 (Fig. 9) of the transaction differential mechanism will, in this case not be moved, and the associated indicator 167 (Fig. 1) will indicate "cash" which is the normal indication for the machine shown.

During a further operation of the machine the slots in the cams 134 (Fig. 2) willl then be effective to rock the universal rod 137 in a reverse direction or rearwardly so that each segment 146 will be returned to its normal position and the related racks 214 (Fig. 15) will be brought to their normal positions, thus entering upon the totalizer elements of the "cash" totalizer, as well as of the "grand" totalizer the amount represented by the depressed keys. Upon a continued operation of the machine the levers 139T and 145T of the transaction differential mechanism will next be separated and the co-operation of the pin 227 (Fig. 13) with the forward end of the cam slot 230 will force the arm 215 forwardly positively withdrawing the "cash" totalizer pinions from mesh with the actuating racks. At the same time the spring 237 will be permitted to force the plate 235 outwardly and carry the "grand" totalizer elements out of mesh with the racks.

At a certain point in the operation of the machine preferably toward the end of the operation, the cams 119 (Fig. 2) will be effective to rock the bail 115 downwardly thus rocking all the amount key detents 72 in the same direction disengaging the lugs 71 from the notches 70 of the depressed keys and permitting the springs 68 to return the depressed keys to their normal positions. The clerk's and transaction keys are similarly released.

While the printing segments were at their differentially adjusted positions the cam 197 (Fig. 7) co-operating with the member 195 will have rocked the platen 185 (Fig. 15) downwardly against the type and by means of the inking ribbon will have effected a printing impression upon the record strip which is then fed an increment by means of the pawl 199 (Fig. 7) in the usual manner. At the end of the operation of the machine the operator may, if desired, enter any written notation adjacent the printed item this being permitted by means of the slot 203 (Fig. 1) in the glass 188 through which a portion of the printed record strip is visible.

Subsequent items may be entered in substantially the same way in the "cash" totalizer and when any totalizer element passes through its zero position its projection 256 co-operating with the trip tooth 257 (Fig. 17) will disengage the shelf 260 from the lug 263 permitting the pawl 262 to engage the ratchet wheel 266 of the totalizer element of the next higher order so that when the associated transfer operating plate 270 (Fig. 15) is operated by means of the projection 275 of the disk 274, the plate 270 will be rocked so that the pawl 262 will impart a unit of movement to the totalizer wheel of the next higher order.

When it is desired to perform a "no sale" operation, which is utilized sometimes for the purpose of obtaining access to a cash drawer with which the machine is intended to be supplied as shown very generally in Fig. 5, the "no sale" key 64 (Fig. 1) is depressed and this is followed by the depression of the desired clerk's key. In this instance the lever 145T (Fig. 13) will be unlocked by the disabling of the zero stop pawl 89 of the transaction bank which will permit the lever 145T to rock upwardly until it strikes the lower side of the stem of the depressed "no sale" key after which the lever 139T will be moved downwardly until it strikes the opposite side of the stem of the depressed "no sale" key. During the upward movement of the lever 145T the lug 229 will be disengaged from the slot 216 of the arm 215 of the "cash" totalizer and as the lever 145T rotates about its pivotal point 147 the lug 229 will pass successively through the notches of the arms 215 of the "paid out" and "charge" totalizers and finally will occupy a position between the arms 215 of the "charge" and "received on account" totalizers.

When the pin 227 enters the cam slot 230 to rock the member 228 clockwise it will not draw the "grand" totalizer 232 into mesh with the actuating racks since the pin 243 is at this time over a cut-away portion of the plate 235. However, the printing segment associated with the transaction bank will be adjusted to such a position that it will print upon the record strip the letters "N. S" and since the clerk's printing segment is adjusted differentially there will also be printed an initial together with a line of zeros, since it is assumed that no amount keys are depressed in a "no sale" operation.

"Paid out" transactions are entered in the usual way, that is, by the depression of the amount keys followed by the depression of the "paid out" key with a subsequent depression of the desired clerk's key. When the "paid out" key is depressed the transaction differential lever 145T will be adjusted to such an extent that the lug 229 will engage the notch 216 of the arm 215 of the "paid out" totalizer so that in this instance the pinions of the "paid out" totalizer will be drawn in mesh with the actuating racks.

In "paid out" transactions the pin 242 will be located over a cut-away portion of the plate 235 so that the amount entered in the "paid out" totalizer will not be entered upon the "grand" totalizer 232. The other transactions, such as "received on account" and "charge" are entered in the usual manner, the operator in each instance depressing the appropriate transaction key, and in "charge" transactions the amount registered will also be accumulated by the "grand" totalizer 232 as well, while in "received on account" transactions the "grand" totalizer will not be operated.

Attention is directed to the fact that whenever a totalizer is to be operated the notch 248 of the segment plate 244 will register with the lower end of the arm 215 of the selected totalizer, but at any other time the lower end of the arm will engage the periphery of the segmental plate 244. In a similar manner, when it is desired to engage the "grand" totalizer with the actuating racks one of the notches 251 and 253 of the plate 250 for "cash" and "charge" entries, respectively, will be registered with the lower end of the arm 215 of the "grand" totalizer and at any other time the "grand" totalizer is retained in its upward position by the periphery of plate 250 as well as by the spring 237 which urges the plate 235 upwardly.

In a similar manner all of the transactions occurring during the period of business under consideration are successively entered in the machine and when it is desired to obtain the total standing upon the various totalizers without subsequently resetting them the total lever 61 is unlocked and then adjusted so that it is adjacent the legend "read".

If the total lever should have been improperly adjusted the cut-out portion 303 (Figs. 11 and 12) of one of the annular rings 300 will be directly in alignment with the beveled edge 302 of arm 222 thereby locking the shaft 57 and therefore the crank handle so that as long as the total lever is not set properly, even though the machine may be released by the total lever or clerk's key the crank cannot be operated.

When the total lever is moved to the "read" position the camming portion 284 (Fig. 4) of the total lever will, by co-operation with the rearward extension of the arm 285 rock the rod 286 (Fig. 10) downwardly so that by its co-action with the extension 288 it will rock the arm 90 downwardly and release the machine for an operation in exactly the same manner as the clerk's keys do. At the same time the releasing connections (Fig. 21) controlled by the transaction keys are rendered effective by movement of the rod 286 into the path of the member 902.

As the rod 286 is moved downwardly the coaction with the rearward portion of the arms 126 (Fig. 4) will rock the detents 72 of all of the amount key banks and, if the modified form of Fig. 20 is employed, will disengage the lugs 71 of the related detents from the notches of any of the previously depressed keys permitting the springs 68 to return any of the keys which have been depressed prior to movement of the total lever from the "add" to the "read" position.

When the detents are moved downwardly each of the zero stop pawls 80 of the amount banks will be disabled and in the same way the plate 289 (Fig. 3) will disable the zero stop pawl 80 for the actuators of the two highest denominational orders.

Furthermore, it should be noted that when the rod 286 is moved downwardly the shaft 76 will be rocked clockwise bringing the arms 292 (Fig. 10) in rear of the rearmost key stops of the groups provided for the amount and clerk's bank of keys, locking all the key stops of these banks against operation and thereby preventing a depression of any of the amount keys and clerk's keys during totaling operations. The connections from rod 286 to the shaft 76 may be direct or they may be flexible and include a spring 761 as shown in Fig. 20. If it is direct as shown in Figs. 5, 8, and 10 the rod 286 cannot be rocked and the total lever will be locked so long as an amount or clerk's key is depressed.

When it is desired to print a total of the amount standing on the "cash" totalizer the crank handle is given two rotations as in adding and as the crank is operated the shaft 57 and cam 307 will be rocked in the direction of the arrow shown in Fig. 11, the pin 224 describing a path defined by the eccentric portion 308 of the slot formed in the cam 307 so that the arm 222 will be rocked upwardly with the result that the stud 220, (Fig. 13) will be rocked forwardly so that the pin 227 carried by the lever 139ᵀ will engage the cam member 228 during the first partial operation of the machine so that the pinions of the "cash" totalizer 231 will be meshed with the operating racks 214 prior to any movement of the latter. Upon a further operation of the machine the cams 134 (Fig. 2) will be effective to rock the universal rod 137 forwardly, but since the springs 141 have sufficient tension to hold the forward ends of the levers 139 against the abutment 140 the continued movement of the universal rod 137 about the pivotal point 136 will result in a clockwise rotation of the amount levers 145, rack plates 146 (Fig. 2) and the connected actuating racks 214 and type segments 173 (Fig. 15) and since the totalizer pinions of the "cash" totalizer are, at this time, in engagement with the racks each of the latter will be moved until the tripping projection of the related totalizer element engages its trip tooth at which time the corresponding lever 145 will be positively stopped and continued movement of the universal rod 137 will rock the associated lever 139 until it is separated from its connected lever 145 only by the pin 152. Due to the action of the pair of complementally movable elements 139 and 145 of each order upon the related stud 152 and link 163 the corresponding indicators will be positioned to display the amounts standing on the several orders of the selected totalizer. As has already been stated the two differential units related to the two higher orders of the totalizer may be provided with similar indicating connections if desired in which case the opening at the top of the cabinet would have to be enlarged to display the entire total. If these extra connections are omitted only the four lower denominations of the total will be indicated. At this time also each printing segment will have been adjusted to a position determined by the related totalizer pinion and the platen will be operated to effect a printing impression upon the record strip to print the total which has been standing upon the "cash" totalizer. While the pinions are still in mesh with the actuating racks the latter are then moved to a reverse direction so that the amounts subtracted from the totalizer elements will be re-entered upon the same.

At the extreme end of the operation of the machine the eccentric portion 314 (Fig. 11) of the cam slot in the cam 307 will be effective to rock the arm 228 so that the stud 220 (Fig. 13) will separate the transaction differential levers 139ᵀ and 145ᵀ and positively withdraw the totalizer pinions from mesh with the actuating racks.

When the total lever is moved to the "read" position it will rock the plate 235 (Fig. 13) clockwise so that the projection 242 will be disengaged from the pin 243 and the latter will be positioned at a cutaway portion 317 between the projections 241 and 242 so that when the "cash" totalizer is rocked into and out of engagement with the pinions of the racks during totaling operations, rocking of the member 228 will not cause movement of the plate 235, and, therefore, will not permit engagement of the "grand" totalizer pinions with the actuating racks.

It will also be observed that when the total lever is moved to the "read" position the plate 109 (Fig. 9) is rocked downwardly disengaging the extension 108 from the pin 107 of the "grand" total key 62, thereby unlocking the latter so that the total of the "grand" totalizer may be obtained. When the "grand" total key 62 is depressed it will serve to release the machine by the connections shown in Figs. 4 and 21, and the zero stop pawl 80 (Fig. 13) of the transaction bank will be disabled so that when the machine is operated the transaction lever 145 will be released for movement until it strikes the stem of the "grand" total key which will permit the pin 243 to co-operate with the projection 241 while the camming member 228 will be moved upwardly sufficiently to disengage the lug 229 from the slot 216 of the arm 215 related to the "cash" totalizer. Therefore, when the pin 227 engages the cam slot 230 it will force the plate 235 downwardly and by means of the slot 234 engaging the pin 233 will draw the arm 215 of the "grand" totalizer downwardly and immediately engage the "grand" totalizer pinions with the actuating racks 214. The rest of the totaling operation for the "grand" totalizer is similar to that described in connection with the "cash" totalizer totaling operation, and will, therefore not be repeated.

Printing of the totals standing upon the "paid out", "charge" and "received on account" totalizers are obtained by merely depressing the desired key and then operating the crank handle so that in each instance the lever 145ᵀ will be moved differentially so that the lug 229 will engage the slot 216 of the corresponding arm 215 thereby engaging the pinions of the desired totalizer with the actuating racks which are then reciprocated to adjust the type carriers differentially and subsequently to re-enter the amount subtracted from the totalizer elements. In obtaining the totals from the "paid out", "charge", and "received on account" totalizers, it will be noted that in each case the pin 243 will be located over a cut-away portion of the plate 235 so that the "grand" totalizer will not be simultaneously meshed with any of the other totalizers during total operations.

In order to obtain the totals from the different totalizers and reset them to zero the total lever is unlocked and then moved to the extreme right (Fig. 1) or the "reset" position. When the lever is moved to the "reset" position the pin 223 (Fig. 12) is entirely disengaged from co-operation with the cam 225, while the pin 224 (Fig. 11) will be moved deeper into the slot 308 of the cam 307 so that in resetting operations the totalizer pinions will also be immediateley drawn into engagement with the actuators which are then moved upwardly to differential extents and when the racks 214 have been properly set by the bringing together of the amount differential arms 139 and 145 the stud 224 will be at the junction of the slots 312 and 313, and since the slot 312 is deeper than the slot 313 the pin 224 striking the wall 318 will pass into the slot 312 thereby rocking the stud 220 (Fig. 13) to the rear again so that the zeroized totalizer elements will be withdrawn from the actuating racks which are then returned to normal.

When the lever is in the "reset" position the machine is conditioned for resetting the "cash" totalizer 231 and resetting of any of the other totalizers may be performed by the depression of the related key, and as long as the total lever remains in the "reset" position the totals may be printed upon the record strip and the elements will be left in their zero positions.

Attention is also called to the fact that upon a partial operation of the machine in item entering, reading and resetting operations the sides of the adjustment annular rings 300 (Figs. 11 and 12) engaging the beveled edge 302 of arm 222 will prevent any movement of the spool 296 so that the total lever is positively locked in its adjusted position during operations of the machine.

While the form of embodiment of the invention herein shown and described is admirably adapted to fulfill the objects primarily stated it is to be understood that it is not intended to confine the invention to the one form herein shown, since it may be embodied in various forms all coming within the scope of the claims which follow.

What is claimed is:

1. In an accounting machine, the combination of two differentially movable members one mounted upon the other, of selective stops for positively limiting the extents of movement of both members, a main operating mechanism for moving the members variable extents dependent upon the stop selected, the sum of the movements of the two members being always constant, and a differentially adjustable element operated by one of the differentially movable members.

2. In an accounting machine, the combination of a differentially adjustable element, of an actuator therefor, differentially adjustable members movable complementary extents to adjust the actuator and element, a bank of keys cooperating directly with the adjustable members adapted to control the extents of movement of the differentially movable members, a cam slot formed in one of the differentially adjustable members, an operating member co-operating with the cam slot and a connection to cause the other differentially adjustable member to be actuated by the operating member.

3. In an accounting machine, the combination of a differentially adjustable element, an actuator therefor, selective stops, a pair of differentially movable members one mounted upon the other for controlling the actuator, and an operating member co-operating with only one of the differentially movable members whereby the members are moved complementary extents dependent upon the stop selected.

4. In an accounting machine, the combination of two differentially movable levers one mounted upon the other, selective stops for limiting the movement of the levers, a cam slot formed in one of the levers, a rod engaging the cam slot and an operating member having excursions of invariable extents during all operations of the machine for operating the rod.

5. In an accounting machine, the combination of two differentially movable levers one mounted upon the other, selective stops for limiting the movement of the levers, a cam slot formed in one of the levers, a rod engaging the cam slot, an operating member having excursions of invariable extents during all operations of the machine for operating the rod, and a spring connected to one of the levers to assist in returning them to home position.

6. In an accounting machine, the combination of two differentially movable levers one mounted upon the other, selective stops for limiting the movement of the levers, an operating means adapted to first move one of the levers until it engages the selected stop, and to thereafter positively move the other lever until it engages the opposite side of the selected stop.

7. In an accounting machine, the combination of two differentially movable levers one provided with a fixed pivot and the other a floating pivot, selective stops for limiting the extents of movement of the levers, and an operating member for moving one of the levers about its fixed pivot until it engages one side of a selected stop and for then causing the other lever to move about its floating pivot until it engages the other side of said stop.

8. In an accounting machine, the combination of two differentially movable levers one provided with a fixed pivot and the other a floating pivot, selective stops for limiting the extents of movement of the levers, a cam slot formed in one of the levers, and an operating member engaging the cam slot for moving one of the levers about its fixed pivot until it engages one side of a selected stop and for then causing the other lever to move about its floating pivot until it engages the other side of said stop.

9. In an accounting machine, the combination of a plurality of totalizers, of totalizer actuating means, a pair of differentially and complementally movable members, means for giving said members differential and complementary movements combining to a constant value, and devices for each totalizer selectively operated by the differentially movable members when the latter are moved to a position adjacent the selected totalizer to bring the latter into engagement with the totalizer actuating means.

10. In a machine of the class described, the combination of a plurality of totalizers, totalizer actuating means, a pair of differentially and complementally movable members, means for giving said members differential and complementary movements combining to a constant value, and means controlled by the differentially movable members for engaging a desired totalizer with the totalizer actuating means, the totalizer engaged for operation being dependent upon the position which the movable members assume.

11. In an accounting machine, the combination of a totalizer, of totalizer actuating means therefor, an operating mechanism, a pair of differentially movable levers movable toward each other, means whereby the operating mechanism causes a differential positioning of the levers, and means whereby the levers cause the engagement of the totalizer with the totalizer actuating means as one of the levers approaches the other.

12. In a machine of the class described, the combination of a pivoted totalizer, actuating means therefor, a device which when operated will engage the totalizer with the actuating means, a pair of differentially and complementally movable members, and means whereby said members actuate the device to engage the totalizer with the actuating means.

13. In a machine of the class described, the combination of a totalizer, actuating means therefor, means whereby the totalizer may be moved into engagement with the actuating means, a pair of differentially and complementally movable members one being provided with camming means adapted to co-operate with the first mentioned means, and means whereby the other differentially movable member upon approaching its related member will operate the camming means to move the totalizer into engagement with the actuating means.

14. In an accounting machine, the combination of a totalizer, of totalizer actuating means therefor, of an operating mechanism, a pair of differentially movable levers, movable toward and away from each other, means whereby the operating mechanism causes a differential positioning of the levers, means whereby the levers will engage the totalizer with the totalizer actuating means as one approaches the other in their movements, and manipulative devices for controlling the differential movements of the levers.

15. In an accounting machine, the combination of a plurality of totalizers, of a set of keys one for each totalizer, totalizer actuating means, a pair of differentially and complementally movable members, means under control of the keys whereby the members are moved differentially and to complemental extents, and means controlled by the differentially movable members and the key operated for engaging the desired totalizer with the totalizer actuating means.

16. In a machine of the class described, the combination of a plurality of totalizers, actuating means therefor, a pair of levers movable differentially and to complementary extents, said levers being arranged to normally engage one of the totalizers with the actuating means upon an operation of the machine, a bank of special keys, and means whereby the special keys control the positioning of the levers to select another totalizer and engage it with the actuating means.

17. In an accounting machine, the combination of a plurality of totalizers, actuating means therefor, a pair of levers movable differentially and to complementary extents and so arranged as to normally engage one of the totalizers with the actuating means upon an operation of the machine, a bank of special keys, and means whereby the keys control the positioning of the levers so as to cause the engagement of a selected one or a plurality of totalizers.

18. In an accounting machine, the combination of a plurality of totalizers adapted to be simultaneously operated, totalizer actuating means common to the totalizers, a pair of levers movable differentially and to complementary extents, and means, including the levers, to simultaneously engage the totalizers with the totalizer actuating means.

19. In an accounting machine, the combination of a plurality of totalizers for segregating various transactions, of a grand totalizer for accumulating the totals entered in a plurality of the segregating totalizers, totalizer actuating means common to all of the totalizers, a bank of totalizer selecting keys, a pair of levers movable differentially to complementary extents arranged to normally engage the grand totalizer and one of the segregating totalizers with the totalizer actuating means upon operation of the machine, and means under control of the keys whereby any other segregating totalizer may be engaged with the totalizer actuating means.

20. In an accounting machine, the combination of a plurality of totalizers for segregating the various transactions, a grand totalizer for accumulating the totals entered in certain of the segregating totalizers, totalizer actuating means common to all of the totalizers, a bank of totalizer selecting keys, a pair of levers movable differentially and to complementary extents and arranged to normally engage the grand totalizer and one of the segregating totalizers with the totalizer actuating means upon operation of the machine, means under control of the keys whereby any other segregating totalizer may be engaged with the totalizer actuating means, and means to engage a certain segregating totalizer with the totalizer actuating means without also engaging the grand totalizer.

21. In an accounting machine, the combination of a totalizer, actuators therefor, a pair of pivoted levers movable toward each other, a member carried by one of the levers adapted to engage the totalizer with the actuators, and means carried by the other lever adapted to operate the member for positively engaging the totalizer with the actuators.

22. In an accounting machine, the combination of a plurality of totalizers adapted to segregate various transactions, a grand totalizer for accumulating the totals of transactions entered in certain of the segregating totalizers, totalizer actuating means common to all of the totalizers, a bank of totalizer selecting keys, a differential totalizer selecting mechanism arranged to normally engaged the grand totalizer and one of the segregating totalizers with the totalizer actuating means, and means under control of the selecting keys whereby any other segregating totalizer may be engaged with the totalizer actuating means.

23. In an accounting machine, the combination of a plurality of totalizers, totalizer actuating means common to all the totalizers, a totalizer selecting mechanism movable differentially and to complementary extents whereby any desired totalizer may be engaged with the actuating means, and operated, and means movable with the totalizer selecting mechanism whereby the undesired totalizers are locked against movement.

24. In an accounting machine, the combination of a plurality of totalizers including a grand totalizer, totalizer actuators common to all of the totalizers, a pair of levers movable differentially and complementary extents, and means carried by one of the levers whereby it simultaneously effects the engagement of a selected totalizer and the grand totalizer with the totalizer actuators.

25. In an accounting machine, the combination of a plurality of totalizers, a single actuating means common to all of said totalizers, means for establishing a co-operative relation between said actuating means and any one of the totalizers, said means comprising a series of engaging connections one for each totalizer, a plurality of levers movable differentially and complementary extents, one of said levers carrying means adapted to engage one of the totalizer engaging connections, a series of keys, and means controlled thereby for establishing a co-operative relationship between one of the engaging connections and the lever.

26. In an accounting machine, the combination of a plurality of totalizers, a single actuating means common to all of said totalizers, means for establishing a co-operative relation between said actuating means and any one of the totalizers, said means comprising a series of engaging connections one for each totalizer, a plurality of levers movable differentially and complementally one of said levers being provided with means adapted to engage one of the totalizer engaging connections, a series of keys for governing the extent of movement imparted to the levers, a main operating device, and means controlled by the main operating device for moving the levers differentially under control of the keys to establish the engagement between said one of the levers and the engaging connections, whereby the desired totalizer is engaged with the actuating means.

27. In a machine of the class described, the combination of a bank of amount keys, a pair of levers movable differentially and complementary extents depending upon the key depressed, an actuator movable with one of the levers, a plurality of totalizers, a supplemental pair of levers movable differentially and complementary extents for selecting a totalizer and engaging it with the actuator and a plurality of special keys for controlling the movement of the totalizer selecting levers.

28. In a machine of the class described, a plurality of totalizers, actuators therefor, a series of selecting keys and a positive differential mechanism controlled by said keys for selecting a totalizer to be actuated, said mechanism being adapted to cause engagement of the selected totalizer with the actuators.

29. In a machine of the class described, a bank of key controlled stops, a pair of members associated with said bank of stops and pivoted on different centers, and positive means for rocking the members in opposite angular directions to engage opposite sides of one of said stops.

30. In a machine of the class described, a plurality of keys, an operating mechanism, a pair of pivotally mounted members adapted to cooperate with said keys, one of said members being mounted on the other means differentially operated by said members and connections from said operating mechanism for rocking said members complementary extents under control of said keys.

31. In a machine of the class described, a totalizer, actuating means therefor, a pair of pivoted arms movable toward each other, and means, including one of the arms, to engage said totalizer with said actuating means.

32. In a machine of the class described, a totalizer, actuating means therefor, a pair of pivoted arms movable toward each other, means, including one of the arms, to engage said totalizer with said actuating means, and selective means for moving said arms at different times during item entering and totaling operations.

33. In a machine of the class described, the combination of a plurality of totalizers, actuators therefor, a plurality of devices connected to said totalizers for establishing a connection between a totalizer and the actuators, a differentially movable element arranged to be moved into position adjacent to a selected one of said devices and means for moving said element at an angle to its differential movement to cause said element to move said selected device for establishing a connection between the related totalizer and the actuators.

34. In a machine of the class described, a main drive, a pivoted main positioning member, a pivoted auxiliary positioning member, a pivoted common actuating member moved by the main drive, a plurality of totalizer wheels situated radially of said actuating member, and actuated thereby, and a totalizing mechanism for the totalizer wheels including means to selectively connect one of the totalizer wheels with the actuating member, and means enabling the main drive to move the actuating member and the main positioning member until the connected totalizer wheel reaches zero, and to thereafter move the auxiliary positioning member a complementary extent.

35. In a machine having complementary movement differential mechanism, a totalizer wheel, pivoted main and auxiliary complemental members used in controlling the movement of the totalizer wheel, and a totalizing mechanism for the wheel, including means to lock the main complemental member when the totalizer wheel reaches zero, and means to thereafter move the auxiliary member a complemental extent, the locking means including a member pivoted coaxially with the main complemental member.

36. A machine having complementary movement differential mechanism, a totalizer wheel, pivoted main and auxiliary complemental members used in controlling the movement of the totalizer wheel, and a totalizing mechanism for the wheel, including means to lock the main complemental member when the totalizer wheel reaches zero, and means to thereafter move the auxiliary member a complemental extent, the locking means including a member pivoted coaxially with the main complemental member, and an element connecting the coaxially pivoted member with the main complemental member, and operating on a separate pivot.

37. In a machine having complementary movement differential mechanism, a pivoted common actuating member, a plurality of totalizer wheels situated radially of said actuating member, and adapted to be actuated thereby, pivoted main and auxiliary complemental members used in controlling the movement of the totalizer wheels, and a totalizing mechanism for the wheels, including means to selectively connect one of the wheels with the actuating member, a train of elements, including the actuating member, to lock the main complemental member when the connected totalizer wheel reaches zero, and means to thereafter move the auxiliary member its complemental extent, one of the elements of the locking train being pivoted coaxially with the main complemental member.

38. In a machine having complementary movement differential mechanism, a pivoted common actuating member, a plurality of totalizer wheels situated radially of said actuating member, and adapted to be actuated thereby, pivoted main and auxiliary complemental members used in controlling the movement of the totalizer wheels, and a totalizing mechanism for the wheels, including means to selectively connect one of the wheels with the actuating member, a train of elements, including the actuating member, to lock the main complemental member when the connected totalizer wheel reaches zero, and means to thereafter move the auxiliary member its complemental extent, one of the elements of the locking train being pivoted coaxially with the main complemental member and another element being mounted on a separate pivot and connecting the coaxially pivoted member with the main complemental member.

39. A machine having complementary movement differential mechanism, a totalizer wheel, pivoted main and auxiliary complemental members used in controlling the movement of the totalizer wheel, and a totalizing mechanism for the wheel, including means to lock the main complemental member when the totalizer wheel reaches zero, means to thereafter move the auxiliary member a complemental extent, and a flexible member cooperating with the complemental members to cause the main member to travel to its moved position before the auxiliary member begins its complemental movement.

40. A machine having complementary movement differential mechanism, a totalizer wheel, pivoted main and auxiliary complemental members used in controlling the movement of the totalizer wheel, and a totalizing mechanism for the wheel, including means to lock the main complemental member when the totalizer wheel reaches zero, means to thereafter move the auxiliary member a complemental extent, and a flexible member connected to the auxiliary member to hold the same from beginning its complemental movement until the main member is stopped in moved position

ALLEN A. DICKE.

CERTIFICATE OF CORRECTION.

Patent No. 2,048,060.                               July 21, 1936.

ALLEN A. DICKE.

It is hereby certified that error appears in the printed specification of the above numbered patent requiring correction as follows: Page 4, first column, line 16, after "of" third occurrence, insert the article the; page 9, second column, line 32, for the word "curves" read curved; page 13, second column, line 47, for "but" read out; page 15, first column, line 65, after the numeral "108" insert the word out; page 17, second column, line 52, for "cotrol" read control; page 21, first column, line 66, for "adjustment" read adjacent; page 22, first column, lines 67 and 68, claim 14, strike out the words "in their movements"; and second column, line 40, claim 19, after the syllable "tially" and the word "extents" insert and; page 23, first column, line 48, claim 26, after "complementally" insert a comma; and that the said Letters Patent should be read with these corrections therein that the same may conform to the record of the case in the Patent Office.

Signed and sealed this 22nd day of September, A. D. 1936.

Henry Van Arsdale (Seal)                                                       Acting Commissioner of Patents.